(12) United States Patent
Okumura et al.

(10) Patent No.: US 8,736,208 B2
(45) Date of Patent: May 27, 2014

(54) MOTOR CONTROL DEVICE

(75) Inventors: Shigekazu Okumura, Sakurai (JP);
Fumihiko Satou, Kashiwara (JP);
Hiroshi Sumasu, Kashihara (JP)

(73) Assignee: Jtekt Corporation, Osaka-Shi (JP)

( * ) Notice: Subject to any disclaimer, the term of this patent is extended or adjusted under 35 U.S.C. 154(b) by 113 days.

(21) Appl. No.: 13/581,951

(22) PCT Filed: Mar. 25, 2011

(86) PCT No.: PCT/JP2011/057396
§ 371 (c)(1),
(2), (4) Date: Aug. 30, 2012

(87) PCT Pub. No.: WO2011/122482
PCT Pub. Date: Oct. 6, 2011

(65) Prior Publication Data
US 2012/0326644 A1 Dec. 27, 2012

(30) Foreign Application Priority Data

Mar. 29, 2010 (JP) .................................. 2010-075739
Sep. 27, 2010 (JP) .................................. 2010-215853

(51) Int. Cl.
*H02H 7/08* (2006.01)

(52) U.S. Cl.
USPC ................. 318/400.21; 318/362; 318/400.07; 318/400.09; 318/490; 340/657; 340/664; 340/426.31; 340/465; 340/517

(58) Field of Classification Search
CPC .... B62D 5/0487; B62D 5/046; B62D 5/0484; B62D 5/049; H02M 1/32; H02M 7/53873; H02P 29/022; H02P 2209/01; H02P 27/06; H02P 27/08; H02P 6/16; H02P 29/021; H02P 2207/01; H02P 27/042; H02P 21/10; H02P 23/0077; H02P 6/14; H02P 29/02; H02P 2209/07; H02P 6/10; H02P 6/06; H02P 6/08; H02P 6/001; H02P 6/12; H02P 6/22; H02P 6/085; H02P 6/003; H02P 6/002; H02P 6/182; H02P 23/08; Y02T 10/70; Y02T 10/7005; G05B 9/02; G05B 19/4062; G05B 23/0235; B25J 9/1674; B25J 19/06; G05D 1/0077; H02H 7/093; H02H 7/0833; B60K 35/00; B62B 3/0612; B62B 5/063; B01R 31/025; B01R 31/34; H02K 29/00; E21B 47/12; E21B 47/00; E21B 47/06; E21B 47/065; E21B 44/00; E21B 47/022; E21B 44/005; E21B 7/062; G01V 11/002; G01R 31/025; G01R 31/34; A61H 33/005; G08B 21/185; H01H 71/04
USPC ............... 318/515, 299, 400.21, 528, 400.22, 318/782, 563, 565, 648, 650, 652, 799, 809, 318/400.17, 400.26, 801, 715, 265, 369, 318/366; 340/426.31, 465, 648, 517, 664, 340/657; 180/400, 402
See application file for complete search history.

(56) References Cited

U.S. PATENT DOCUMENTS 5,914,582 A * 6/1999 Takamoto et al. ............ 318/801
2005/0174083 A1 * 8/2005 Sato ............................ 318/565
(Continued)

FOREIGN PATENT DOCUMENTS

DE 10 2008 034 326 A1 2/2009
JP A-2007-099066 4/2007
(Continued)

OTHER PUBLICATIONS

International Search Report issued in Application No. PCT/JP2011/057396; Dated Jun. 28, 2011 (With Translation).
(Continued)

*Primary Examiner* — Shawki S Ismail
*Assistant Examiner* — Jorge L Carrasquillo
(74) *Attorney, Agent, or Firm* — Oliff PLC

(57) ABSTRACT

When one of six FETs has short-circuit faulted, a controllable region identification unit stops driving of an electric motor, and then performs processes for determining whether a short-circuit fault has occurred, and when a short-circuit fault has occurred, for identifying the position of the FET that has short-circuit faulted based on phase voltages (induced voltages) $V_U$, $V_V$, and $V_W$ of phases. When the position of the FET that has short-circuit faulted is identified, the controllable region identification unit performs a controllable region identification process. In detail, the controllable region identification unit identifies a "possible region," an "indeterminate region," and a "impossible region" based on phase voltages $V_U$, $V_V$, and $V_W$ of the phases.

16 Claims, 19 Drawing Sheets

(56) References Cited

U.S. PATENT DOCUMENTS

2009/0096394 A1* 4/2009 Taniguchi ............... 318/400.09
2010/0060222 A1* 3/2010 Kezobo et al. ............... 318/490
2010/0263960 A1 10/2010 Nagase

FOREIGN PATENT DOCUMENTS

| JP | A-2008-099394 | 4/2008 |
|---|---|---|
| JP | A-2009-035155 | 2/2009 |
| JP | A-2009-071975 | 4/2009 |
| JP | A-2009-095170 | 4/2009 |
| JP | A-2009-154758 | 7/2009 |
| JP | A-2009-177915 | 8/2009 |
| JP | A-2010-246210 | 10/2010 |
| WO | WO 2008/129658 A1 | 10/2008 |

OTHER PUBLICATIONS

International Preliminary Report on Patentability issued in Application No. PCT/JP2011/057396; Dated Oct. 23, 2012 (With Translation).

* cited by examiner

IND : INDETERMINATE
POS : POSSIBLE
IMP : IMPOSSIBLE

IND : INDETERMINATE
POS : POSSIBLE
IMP : IMPOSSIBLE

FIG. 9

| SHORT-CIRCUIT FAULTED FET | | ELECTRIC ANGLE | 0 | 30 | 60 | 90 | 120 | 150 | 180 | 210 | 240 | 270 | 300 | 330 | 360 |
|---|---|---|---|---|---|---|---|---|---|---|---|---|---|---|---|
| CW | U | LOWER | IND(V) | | POS(V) | | POS(W) | | IND(W) | | POS(V) | | | IND(V) | |
| | V | LOWER | | IMP | | | IND(W) | | POS(W) | | POS(U) | IMP | IND(U) | | IMP |
| | W | LOWER | POS(V) | | IND(V) | | POS(U) | IMP | POS(W) | | IND(U) | | POS(U) | | POS(V) |
| | U | UPPER | IND(W) | | | IMP | | | IND(V) | | POS(V) | | POS(W) | | IND(W) |
| | V | UPPER | POS(W) | | POS(U) | | IND(U) | | | IMP | IND(U) | | IND(W) | | POS(W) |
| | W | UPPER | | IMP | IND(U) | | POS(U) | | POS(V) | | IND(V) | | | IMP | |
| CCW | U | LOWER | IND(W) | | POS(V) | IMP | POS(W) | | IND(V) | IMP | POS(V) | | POS(W) | | IND(W) |
| | V | LOWER | POS(W) | | POS(U) | | IND(W) | | POS(V) | | IND(V) | | IND(W) | | POS(W) |
| | W | LOWER | | IMP | IND(U) | | POS(U) | | IND(W) | | | IMP | IND(U) | | |
| | U | UPPER | IND(V) | | POS(V) | | POS(W) | IMP | IND(W) | | POS(U) | IMP | IND(U) | | IND(V) |
| | V | UPPER | | IMP | | | IND(V) | | POS(W) | | IND(U) | | IND(U) | | IMP |
| | W | UPPER | POS(V) | | IND(V) | | POS(U) | | IND(U) | | POS(W) | | POS(U) | | POS(V) |

IND : INDETERMINATE
POS : POSSIBLE
IMP : IMPOSSIBLE

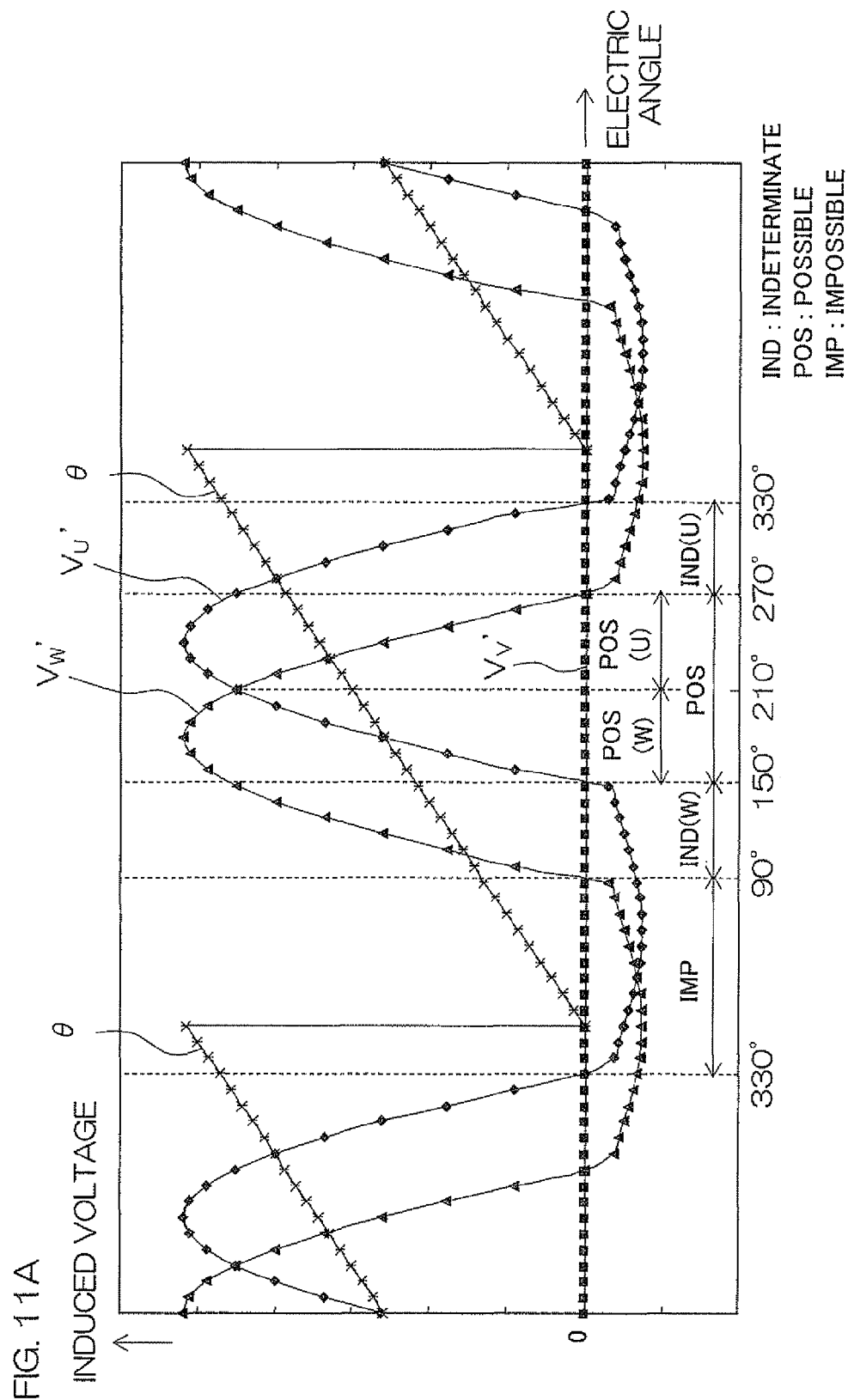

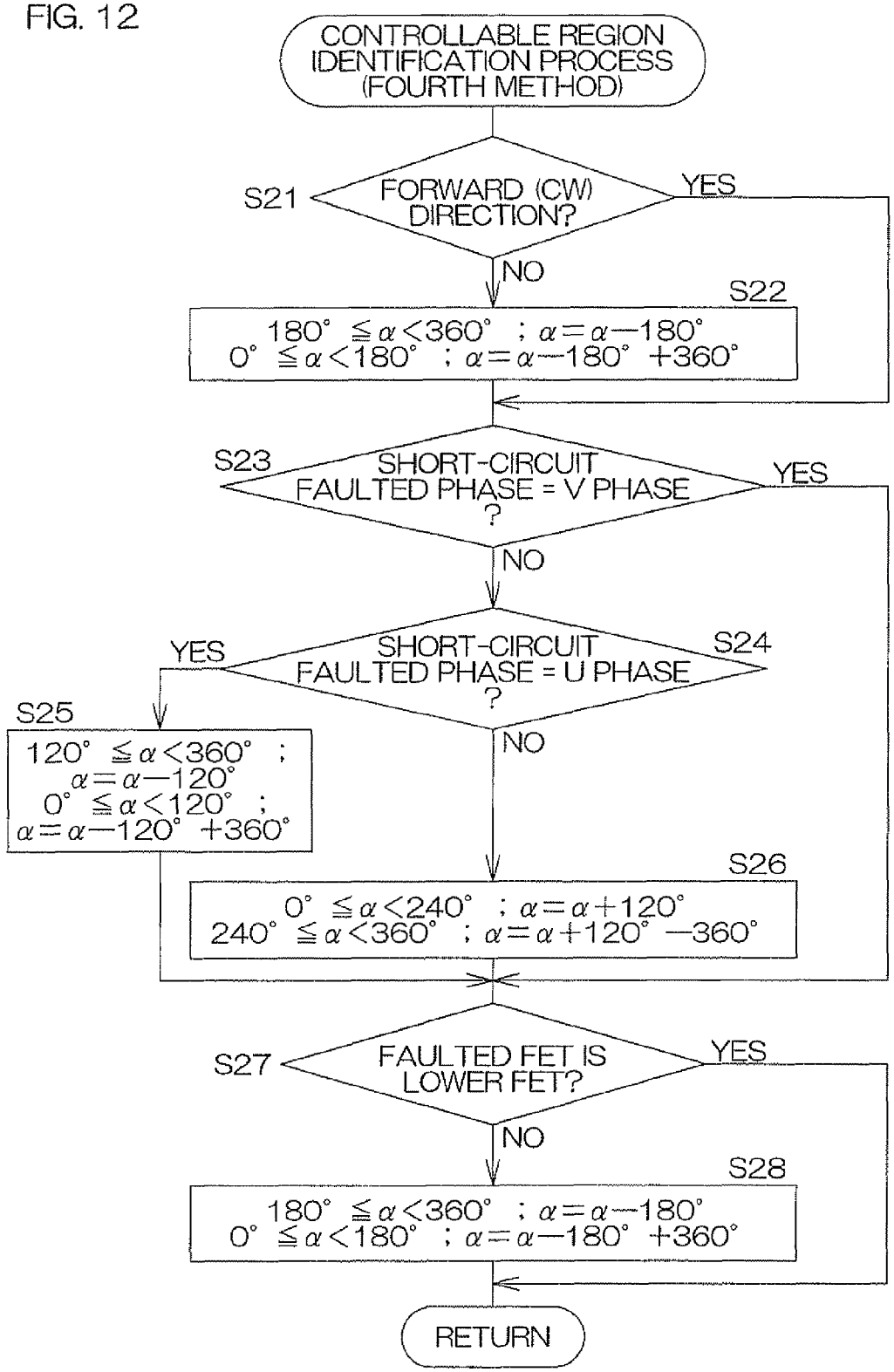

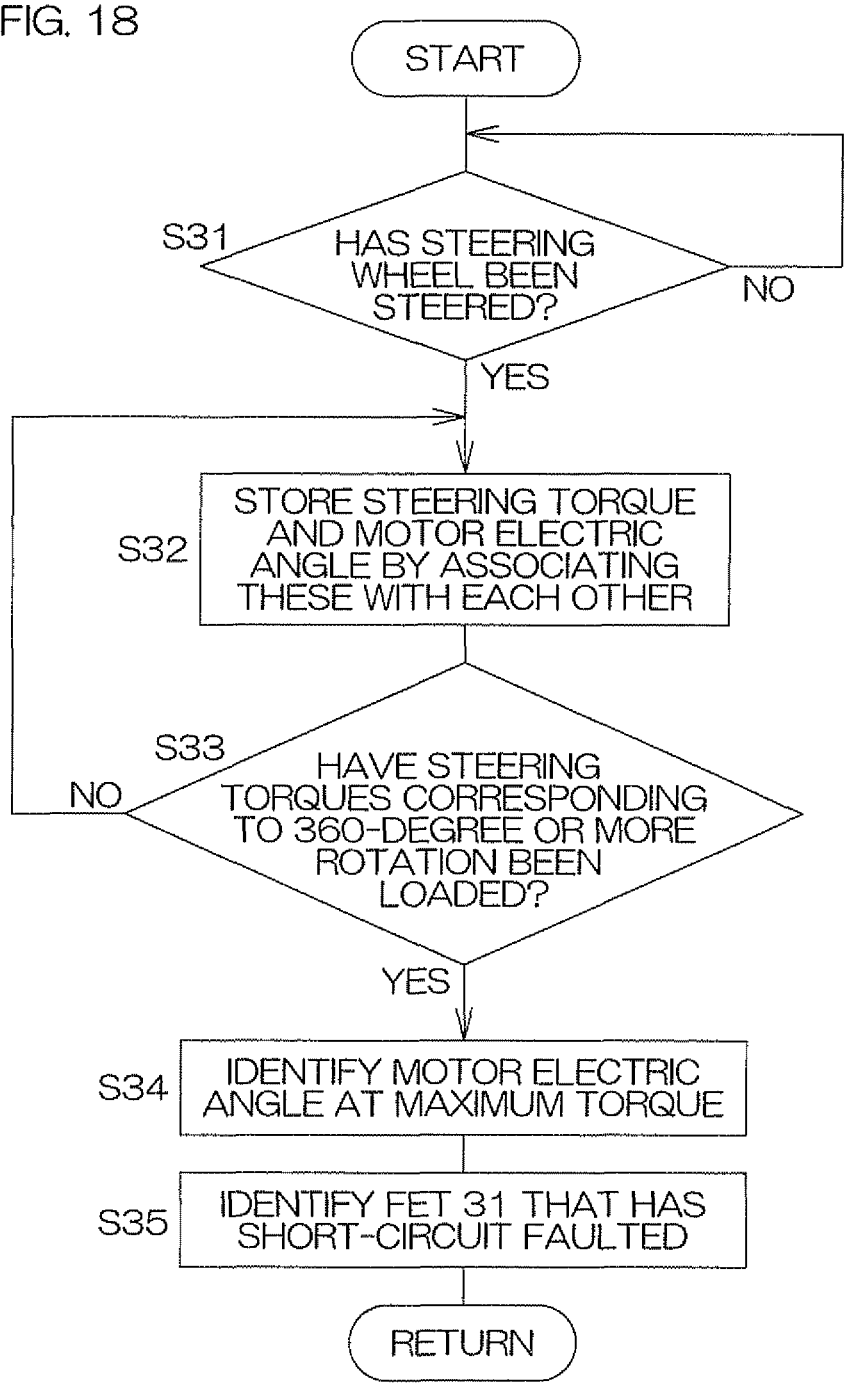

MOTOR CONTROL DEVICE

TECHNICAL FIELD

The present invention relates to a motor control device for driving a three-phase brushless motor. The three-phase brushless motor is used as, for example, a generation source of a steering assist force in an electric power steering system.

BACKGROUND ART

A driving circuit of a brushless motor used in an electric power steering system includes switching elements such as FETs (Field Effect Transistors). When the switching element fails, the brushless motor becomes a load when operating the steering wheel, and steering may become heavy. In order to cope with this problem, a relay is inserted in the connection between the brushless motor and the driving circuit. For example, in a case of a three-phase brushless motor, relays are inserted in motor connections of two phases, respectively, and when control is not performed and when the switching element fails, the relays are turned off.

PRIOR ART DOCUMENTS

Patent Document 1: Japanese Published Unexamined Patent Application No. 2009-35155
Patent Document 2: Japanese Published Unexamined Patent Application No. 2008-99394

SUMMARY OF THE INVENTION

Problem to be Solved by the Invention

In the prior arts described above, when the switching element in the motor driving circuit fails, the relays are turned off, so that the brushless motor cannot be driven. Therefore, in the electric power steering system, a steering assist force (assist force) cannot be generated.

An object of the present invention is to provide a motor control device that enables driving of a three-phase brushless motor when one switching element in the driving circuit of the three-phase brushless motor has short-circuit faulted.

Means for Solving the Problem

A motor control device according to the present invention is for controlling a three-phase brushless motor (18) including a rotor and field coils, and includes a driving circuit (30) that includes three series circuits each formed by connecting two switching elements ($31_{UH}$ and $31_{UL}$; $31_{VH}$ and $31_{VL}$; $31_{WH}$ and $31_{WL}$) in series corresponding to three phases, where the series circuits are connected in parallel between a power supply (33) and a ground (34), and regenerative diodes ($32_{UH}$ and $32_{UL}$; $32_{VH}$ and $32_{VL}$; $32_{WH}$ and $32_{WL}$) are connected in parallel to the respective switching elements, and a controllable region identifying unit (41) configured to identify a rotor rotation angle region in which driving of the three-phase brushless motor is possible as a controllable region when one of the switching elements has short-circuit faulted. The alphanumeric characters in parentheses indicate corresponding components, etc., in preferred embodiments described later, and as a matter of course, the scope of the present invention is not limited to the preferred embodiments. Hereinafter, the same applies to this section.

In this configuration, when one of the switching elements has short-circuit faulted, a rotor rotation angle region in which driving of the three-phase brushless motor is possible is identified as a controllable region. Accordingly, even when one of the switching elements has short-circuit faulted, the three-phase brushless motor can be driven.

In a preferred embodiment of the present invention, when the rotor of the three-phase brushless motor is rotated in a state where all switching elements other than the switching element that has short-circuit faulted are off, in a case where a rotor rotation angle region in which a load current flows in neither of two normal phases is defined as a possible region, a rotor rotation angle region in which a load current flows in either one of the two normal phases is defined as an indeterminate region, and a rotor rotation angle region in which a load current flows in both of the two normal phases is defined as an impossible region, the controllable region identification unit is arranged to identify a region consisting of the possible region and the indeterminate region or the possible region as the controllable region.

It is assumed that one of the switching elements, for example, a low-side switching element ($31_{VL}$) of the V phase has short-circuit faulted. In this case, the V phase is a faulted phase, and other two phases, that is, the U phase and the W phase are normal phases. In the case where the rotor of the three-phase brushless motor is rotated in the state where all switching elements other than the switching element that has short-circuit faulted are off, when the rotor is in a specific first rotation angle region, a load current flows in a first closed circuit (61, refer to FIG. 3) formed by the switching element ($31_{VL}$) that has short-circuit faulted and the regenerative diode ($32_{UL}$) connected in parallel to the low-side switching element ($31_{UL}$) of the U phase that is one normal phase. When the rotor is in a specific second rotation angle region, a load current flows in a second closed circuit (62, refer to FIG. 3) formed by the switching element ($31_{VL}$) that has short-circuit faulted and the regenerative diode ($32_{WL}$) connected in parallel to the low-side switching element ($31_{WL}$) of the W phase that is the other normal phase. The first rotation angle region and the second rotation angle region partially overlap, and in the overlapping region, a load current flows in both of the U phase and the W phase.

Therefore, for example, when the low-side switching element ($31_{VL}$) of the V phase has short-circuit faulted, a rotor rotation angle region in which a load current flows in both of the U phase and the W phase that are two normal phases is identified as an "impossible region," a rotor rotation angle region in which a load current flows in only the U phase that is one normal phase and a rotor rotation angle region in which a load current flows in only the W phase that is the other normal phase are identified as "indeterminate regions," and a rotor rotation angle region in which a load current flows in neither of the normal phases is identified as a "possible region." A region consisting of the "possible region" and the "indeterminate region" or the "possible region" is identified as a "controllable region."

In a preferred embodiment of the present invention, the controllable region identifying unit is arranged to identify the controllable region based on phase voltages of the phases in the state where all switching elements other than a switching element that has short-circuit faulted are off. In this configuration, the controllable region is identified based on phase voltages (induced voltages) of the phases in the state where all switching elements other than the switching element that has short-circuit faulted are off.

For example, when the low-side switching element ($31_{VL}$) of the V phase has short-circuit faulted, a rotor rotation angle region in which phase voltages ($V_U$ and $V_W$) of both normal phases (U phase and W phase) become equal to or less than a phase voltage ($V_V$) of the short-circuit faulted phase (V phase in this example) (a region in which a load current flows in both first and second closed circuits (61 and 62)) is identified as an "impossible region." A rotor rotation angle region in which phase voltages ($V_U$ and $V_W$) of both normal phases (U phase and V phase) become larger than the phase voltage ($V_V$) of the short-circuit faulted phase (V phase in this example) (a region in which a load current flows in neither of the first and second closed circuits (61 and 62)) is identified as a "possible region." A rotor rotation angle region in which the phase voltage of either one of the normal phases (U phase and W phase) becomes larger than the phase voltage $V_V$ of the short-circuit faulted phase (V phase in this example) and the phase voltage of the other normal phase becomes equal to or less than the phase voltage ($V_V$) of the short-circuit faulted phase (a region in which a load current flows in either one of the first and second closed circuits (61 and 62)) is identified as an "indeterminate region." A region consisting of the "possible region" and the "indeterminate region" or the "possible region" is identified as the "controllable region."

On the other hand, when the high-side switching element ($31_{VH}$) of the V phase has short-circuit faulted, a rotor rotation angle region in which phase voltages ($V_U$ and $V_W$) of both normal phases (U phase and W phase) become equal to or more than the phase voltage ($V_V$) of the short-circuit faulted phase (V phase in this example) (a region in which a load current flows in both of third and fourth closed circuits (63 and 64) shown in FIG. 4) is identified as an "impossible region." A rotor rotation region in which the phase voltages ($V_U$ and $V_W$) of both normal phases (U phase and W phase) become smaller than the phase voltage ($V_V$) of the short-circuit faulted phase (V phase in this example) (a region in which a load, current flows in neither of the third and fourth closed circuits (63 and 64)) is identified as a "possible region." A rotor rotation angle region in which the phase voltage of either one of the normal phases (U phase and W phase) becomes smaller than the phase voltage ($V_V$) of the short-circuit faulted phase (V phase in this example) and the phase voltage of the other normal phase becomes equal to or more than the phase voltage ($V_V$) of the short-circuit faulted phase (a region in which a load current flows in either one of the third and fourth closed circuits (63 and 64)) is defined as the "indeterminate region." A region consisting of the "possible region" and the "indeterminate region" or the "possible region" is identified as a "controllable region."

In a preferred embodiment of the preset invention, the controllable region identifying unit is arranged to identify the controllable region based on phase currents of the phases in a state where all switching elements other than the switching element that has short-circuit faulted are off. In this configuration, based on phase currents of the phases in the state where all switching elements other than the switching element that has short-circuit faulted are off, the controllable region is identified.

For example, when the low-side switching element ($31_{VL}$) of the V phase has short-circuit faulted, a rotor rotation angle region in which phase currents ($I_U$ and $I_W$) of both U phase and W phase that are normal phases become larger than zero (a region in which a load current flows in both of the first and second closed circuits (61 and 62)) is identified as an "impossible region." A rotor rotation angle region in which the phase currents ($I_U$ and $I_W$) of both U phase and W phase that are normal phases become zero or less (a region in which a load current flows in neither of the first and second closed circuits (61 and 62)) is identified as a "possible region." A rotor rotation angle region in which the polarity of the phase current of either one of the normal phases (U phase and W phase) becomes zero or less and the phase current of the other normal phase becomes larger than zero (a region in which a load current flows in either one of the first and second closed circuits (61 and 62)) is identified as the "indeterminate region." A region consisting of the "possible region" and the "indeterminate region" or the "possible region" is identified as the "controllable region."

On the other hand, when the high-side switching element ($31_{VH}$) of the V phase has short-circuit faulted, a rotor rotation angle region in which phase currents ($I_U$ and $I_W$) of both U phase and W phase that are normal phases become smaller than zero (a region in which a load current flows in both of the third and fourth closed circuits (63 and 64)) is identified as an "impossible region." A rotor rotation angle region in which the phase currents ($I_U$ and $I_W$) of both U phase and W phase that are normal phases become zero or more (a region in which a load current flows in neither of the third and fourth closed circuits (63 and 64)) is identified as a "possible region." A rotor rotation angle region in which the polarity of the phase current of either one of the normal phases (U phase and W phase) becomes zero or more and the phase current of the other normal phase becomes smaller than zero (a region in which a load current flows in either one of the third and fourth closed circuits (63 and 64)) is identified as an "indeterminate region." A region consisting of the "possible region" and the "indeterminate region" or the "possible region" is identified as a "controllable region."

In a preferred embodiment of the present invention, the controllable region identifying unit is arranged to identify a controllable region based on information showing the position of the switching element that has short-circuit faulted and information that is created in advance for identifying the controllable region from the position of the switching element that has short-circuit faulted. In this configuration, based on information showing the position of the switching element that has short-circuit faulted and information that is created in advance for identifying a controllable region from the position of the switching element that has short-circuit faulted, the controllable region is identified.

For example, a map in which, for each switching element, a "possible region," an "indeterminate region," and an "impossible region" corresponding to the case where the switching element has short-circuit faulted are stored is created in advance. When a short-circuit fault occurs, based on information showing the position of the switching element that has short-circuit faulted and the map, a "possible region," an "indeterminate region," and an "impossible region" are identified. Then, a region consisting of the "possible region" and the "indeterminate region" or the "possible region" is identified as a "controllable region."

In a preferred embodiment of the present invention, the controllable region identifying unit is arranged to identify a controllable region based on information showing the position of the switching element that has short-circuit faulted, direction of rotation of the three-phase brushless motor, and a map created in advance for identifying the controllable region from the position of the switching element that has short-circuit faulted and the direction of rotation of the three-phase brushless motor.

The map may indicate, according to the directions of rotation of the three-phase brushless motor and the switching elements, controllable regions each corresponding to a case where each switching element has short-circuit faulted.

The map may indicate a controllable region corresponding to a case where any one of the switching elements has short-circuit faulted, for example, when the three-phase brushless motor is rotated in either one direction of rotation of forward and reverse directions. In this case, the controllable region identifying unit may include a unit to convert a controllable region indicated by the map into a controllable region corresponding to a position of the switching element that has short-circuit faulted and a direction of rotation of the three-phase brushless motor based on information showing the position of the switching element that has short-circuit faulted, the direction of rotation of the three-phase brushless motor, and the map.

In a preferred embodiment of the present invention, the motor control device further includes a fault position identifying unit (41, S12) to identify, when one of the switching elements has short-circuit faulted, the position of the switching element that has short-circuit faulted, and a motor control unit (41, 43, S15) to drive the three-phase brushless motor by the normal phases when a rotor rotation angle is in the controllable region.

When one of the switching elements has short-circuit faulted, the position of the switching element that has short-circuit faulted is identified. For example, based on the position of the switching element that has short-circuit faulted, a rotor rotation angle region in which driving of the three-phase brushless motor is possible is identified as a controllable region. Then, when the rotor rotation angle is in the controllable region, the three-phase brushless motor is driven. Accordingly, even when one of the switching elements has short-circuit faulted, the three-phase brushless motor can be driven.

The above-described and/or other objects, features, and effects of the present invention are clarified by the following description of the preferred embodiment with reference to the accompanying drawings.

BRIEF DESCRIPTION OF THE DRAWINGS

FIG. 9 is an explanatory view for describing a method (third method) for identifying a controllable region.

FIG. 11A is an explanatory view for describing the method (third method) for identifying a controllable region.

FIG. 12 is an explanatory view for describing a method (fourth method) for identifying a controllable region.

FIG. 18 is a flowchart showing procedures of a modification of a process for identifying an FET that has short-circuit faulted.

BEST MODE FOR CARRYING OUT THE INVENTION

Hereinafter, preferred embodiments of the present invention are described in detail with reference to the accompanying drawings.

Figure 1:
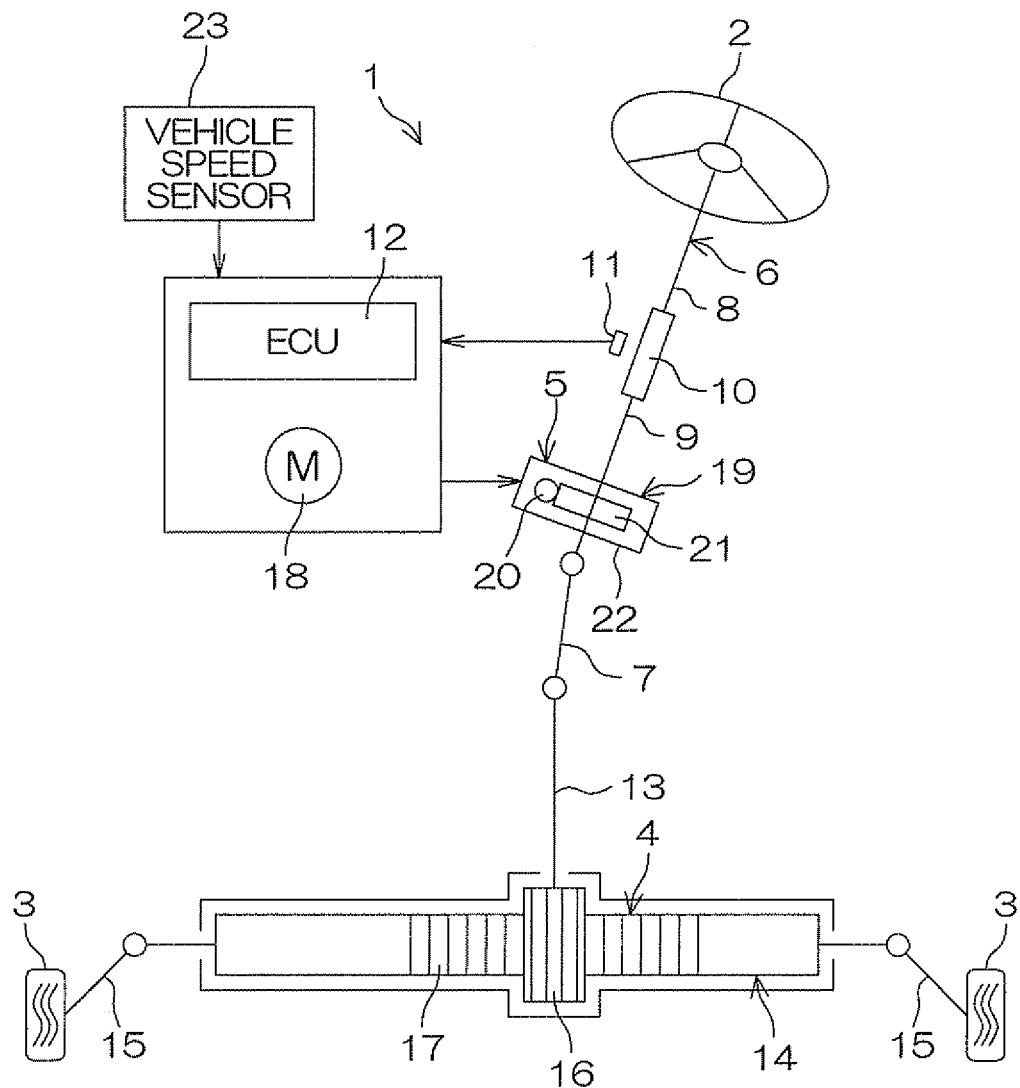
FIG. 1 is a schematic view showing a general configuration of an electric power steering system to which a motor control device according to a preferred embodiment of the present invention is applied.

FIG. 1 is a schematic view showing a general configuration of an electric power steering system to which a motor control device according to a preferred embodiment of the present invention is applied.

The electric power steering system 1 includes a steering wheel 2 as a steering member, a turning mechanism 4 that turns steered wheels 3 in conjunction with rotation of the steering wheel 2, and a steering assist mechanism 5 for assisting driver's steering. The steering wheel 2 and the turning mechanism 4 are mechanically joined via a steering shaft 6 and an intermediate shaft 7.

The steering shaft 6 extends straight. The steering shaft 6 includes an input shaft 8 joined to the steering wheel 2 and an output shaft 9 joined to the intermediate shaft 7. The input shaft 8 and the output shaft 9 are joined rotatable relative to each other coaxially via a torsion bar 10. Specifically, when the steering wheel 2 is rotated, the input shaft 8 and the output shaft 9 rotate in the same direction while rotating relative to each other.

A torque sensor 11 disposed around the steering shaft 6 detects a steering torque applied to the steering wheel 2 based on a relative rotational displacement of the input shaft 8 and the output shaft 9. The steering torque detected by the torque sensor 11 is input into an ECU (Electronic Control Unit) 12. In addition, a vehicle speed detected by the vehicle speed sensor 23 is input into the ECU 12.

The turning mechanism 4 is a rack-and-pinion mechanism including a pinion shaft 13 and a rack shaft 14 as a turning shaft. To each end portion of the rack shaft 14, a steered wheel 3 is joined via a tie rod 15 and a knuckle arm (not illustrated). The pinion shaft 13 is joined to the intermediate shaft 7. The pinion shaft 13 rotates in conjunction with steering of the steering wheel 2. To the tip end (lower end in FIG. 1) of the pinion shaft 13, a pinion 16 is joined.

The rack shaft 14 extends straight along the left-right direction (orthogonal to the straight direction) of the vehicle. At the intermediate portion in the axial direction of the rack shaft 14, a rack 17 that meshes with the pinion 16 is formed. By the pinion 16 and the rack 17, rotation of the pinion shaft 13 is converted into axial movement of the rack shaft 14. By moving the rack shaft 14 in the axial direction, the steered wheels 3 can be turned.

When the steering wheel 2 is steered (rotated), this rotation is transmitted to the pinion shaft 13 via the steering shaft 6 and the intermediate shaft 7. Then, rotation of the pinion shaft 13 is converted into axial movement of the rack shaft 13 by the pinion 16 and the rack 17. Accordingly, the steered wheels 3 are turned.

The steering assist mechanism 5 includes a steering assisting electric motor 18 and a reduction gear mechanism 19 for transmitting an output torque of the electric motor 18 to the turning mechanism 4. The electric motor 3 is a three-phase brushless motor in the present preferred embodiment. The reduction gear mechanism 19 is a worm gear mechanism including a worm shaft 20 and a worm wheel 21 that meshes with the worm shaft 20. The reduction gear mechanism 19 is housed in a gear housing 22 as a transmission mechanism housing.

The worm shaft 20 is driven to rotate by the electric motor 18. The worm wheel 21 is joined rotatably in the same direction as the direction of rotation of the steering shaft 6. The worm wheel 21 is driven to rotate by the worm shaft 20.

When the worm shaft 20 is driven to rotate by the electric motor 18, the worm wheel 21 is driven to rotate, and the steering shaft 6 rotates. Then, the rotation of the steering shaft 6 is transmitted to the pinion shaft 13 via the intermediate shaft 7. The rotation of the pinion shaft 13 is converted into axial movement of the rack shaft 14. Accordingly, the steered wheels 3 are turned. Specifically, by rotationally driving the worm shaft 2 by the electric motor 18, the steered wheels 3 are turned.

The electric motor 18 is controlled by an ECU 12 as a motor control device. The ECU 12 controls the electric motor 18 based on a steering torque detected by the torque sensor 11 and a vehicle speed detected by the vehicle speed sensor 23, etc. In detail, in the ECU 12, a target assist amount is determined by using a map in which the relationship between the steering torque and the target assist amount is stored for each vehicle speed, and control is performed to bring an assist force to be generated by the electric motor 18 close to the target assist amount.

Figure 2:
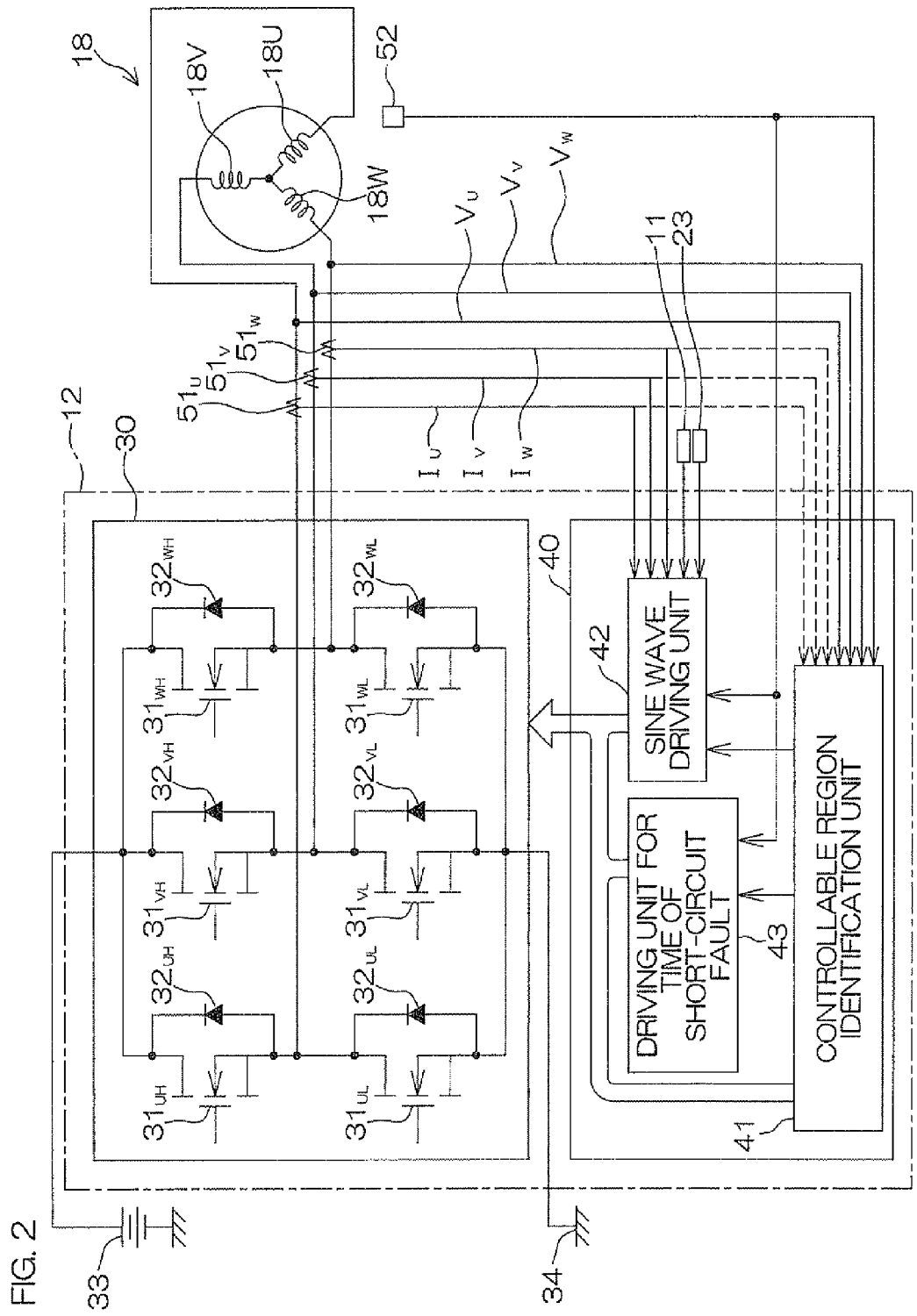
FIG. 2 is a block diagram showing an electric configuration of an ECU as a motor control device.

FIG. 2 is a schematic view showing an electric configuration of the ECU 12 as a motor control device. The electric motor 18 includes a stator having a U-phase field coil 18U, a V-phase field coil 18V, and a W-phase field coil 18W, and a rotor to which permanent magnets to be subjected to repelling magnetic fields from the field coils 18U, 18V, and 18W are fixed.

The ECU 12 includes a driving circuit 30 that generates driving power for the electric motor 18 and a control unit 40 for controlling the driving circuit 30. The control unit 40 consists of a microcomputer including a CPU and a memory (ROM, RAM, nonvolatile memory, etc.) storing operation programs, etc., for the CPU.

The driving circuit 30 is a three-phase bridge inverter circuit. In this driving circuit 30, a series circuit of a pair of FETs (Field Effect Transistors) $31_{UH}$ and $31_{UL}$ corresponding to the U phase of the electric motor 18, a series circuit of a pair of FETs $31_{VH}$ and $31_{VL}$ corresponding to the V phase, and a series circuit of a pair of FETs $31_{WH}$ and $31_{WL}$ corresponding to the W phase are connected in parallel between a DC power supply 33 and a ground 34. To the FETs $31_{UH}$ to $31_{WL}$, regenerative diodes $32_{UH}$ to $32_{WL}$ are connected in parallel, respectively, in orientations that make a forward current flow from the ground 34 side to the DC power supply 33 side.

Hereinafter, the FET on the power supply side of the pair of FETs of each phase may be referred to as a "high-side FET" or "upper FET," and the FET on the ground 34 side may be referred to as a "low-side FET" or "lower FET." To collectively designate the six FETs $31_{UH}$ to $31_{WL}$, they are referred to as "FETs 31." Similarly, to collectively designate the six regenerative diodes $32_{UH}$ to $32_{WL}$, they are referred to as "regenerative diodes 32."

The U-phase field coil 18U of the electric motor 18 is connected to a connection point between the pair of FETs $31_{UH}$ and $31_{UL}$ corresponding to the U phase. The V-phase field coil 18V of the electric motor 18 is connected to a connection point between the pair of FETs $31_{VH}$ and $31_{VL}$ corresponding to the V phase. The W-phase field coil 18W of the electric motor 18 is connected to the connection point between the pair of FETs $31_{WH}$ and $31_{WL}$ corresponding to the W phase. On the connecting wires for connecting the field coils 18U, 18V, and 18W of the phases and the driving circuit 30, current sensors $51_U$, $51_V$, and $51_W$ for detecting phase currents $I_U$, $I_V$, and $I_W$ of the phases are provided. On the electric motor 18 side, a rotation angle sensor 52 such as a resolver for detecting a rotation angle (electric angle) of the rotor is provided.

The control unit 40 functions as a plurality of functional processing units by executing predetermined operation programs stored in the memory. The plurality of functional processing units include a controllable region identification unit 41, a sine wave driving unit 42, and a driving unit 43 for time of short-circuit fault.

The sine wave driving unit 42 drives the electric motor 18 by 180-degree energization sine wave driving by controlling the FETs 31 in a normal state where no fault occurs. Into the sine wave driving unit 42, a rotor rotation angle (electric angle) detected by the rotation angle sensor 52, a steering torque detected by the torque sensor 11, a vehicle speed detected by the vehicle speed sensor 23, and phase currents $I_U$, $I_V$, and $I_W$ detected by the current sensors $51_U$, $51_V$, and $51_W$, are input.

The sine wave driving unit 42 determines a target assist amount based on, for example, the map in which the relationship between the steering torque and the target assist amount (current target value) is stored for each vehicle speed, the steering torque detected by the torque sensor 11, and the vehicle speed detected by the vehicle speed sensor 23. Then, the sine wave driving unit 42 PWM (Pulse Width Modulation)-controls the FETs 31 so that the assist force (torque) to be generated by the electric motor 18 becomes close to the target assist amount based on the target assist amount, the phase currents $I_U$, $I_V$, and $I_W$ of the phases detected by the current sensors $51_U$, $51_V$, and $51_W$, and the rotor rotation angle (electric angle) detected by the rotation angle sensor 52.

The controllable region identification unit 41 performs control for stopping driving of the electric motor 18 when an abnormality of the electric motor 18 is detected, determination as to whether a short-circuit fault has occurred in the FETs 31, identification of the position of an FET that has short-circuit faulted when a short-circuit fault has occurred in the FET 31, and identification of a controllable region. The controllable region is a rotor rotation angle region (electric angle region) in which the electric motor 18 can be driven when one of the six FETs $31_{UH}$ to $31_{WL}$ has short-circuit faulted.

In the case where one of the six FETs $31_{UH}$ to $31_{WL}$ has short-circuit faulted, when the rotor is rotated in a state where all other FETs are off, depending on the electric angle, a load current flows in a closed circuit formed by the FET that has short-circuit faulted and the regenerative diode connected in parallel to a normal FET. In the present preferred embodiment, the controllable region identification unit 41 identifies an electric angle region in which a load current flows in neither of the two normal phases is identified as a "possible region," an electric angle region in which a load current flows in either one of the two normal phases is identified as an "indeterminate region," and an electric angle region in which a load current flows in both of the two normal phases is identified as an "impossible region."

In the present preferred embodiment, a region of the combination of the "possible region" and "indeterminate region" is identified as a controllable region in which the electric motor 18 can be driven, and the "impossible region" is identified as an uncontrollable region in which the electric motor 18 cannot be driven. It is also possible that only the "possible region" is identified as a controllable region in which the electric motor 18 can be driven, and a region of the combination of the "indeterminate region" and "impossible region" is identified as an uncontrollable region in which the electric motor 18 cannot be driven.

Figure 3:
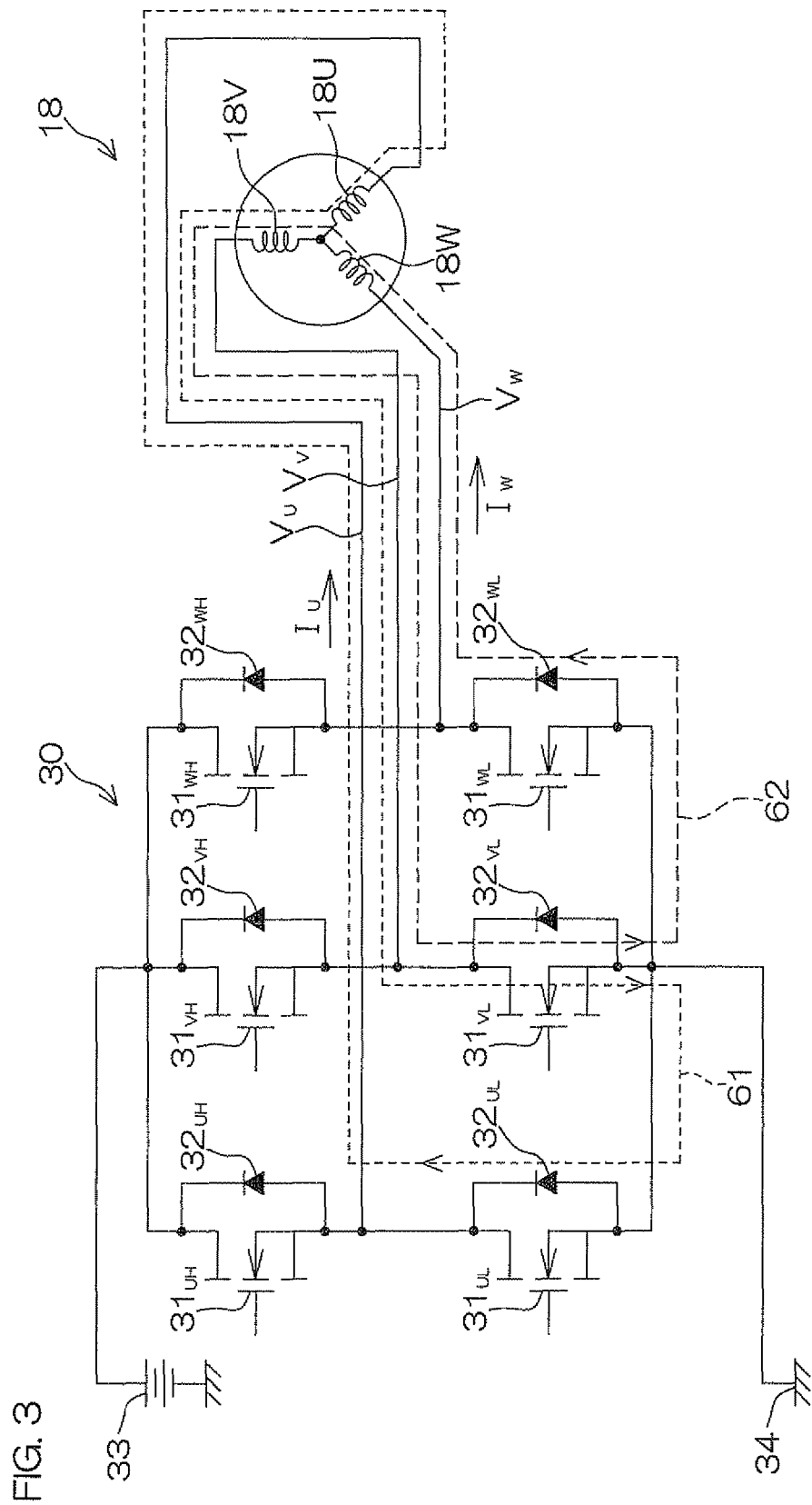
FIG. 3 is an electric circuit diagram showing closed circuits in which a load current flows when a low-side FET has short-circuit faulted.

As shown in FIG. 3, for example, it is assumed that in a case where the low-side FET $31_{VL}$ of the V phase has short-circuit faulted, the rotor is rotated by driver's steering in a state where all other FETs are off. Then, an induced voltage is generated in the electric motor 18, and due to this induced voltage, a load current flows in the direction indicated by the arrow in a first closed circuit indicated by the reference symbol 61 and a second closed circuit indicated by the reference symbol 62.

The first closed circuit 61 includes the low-side FET $31_{VL}$ of the V phase that has short-circuit faulted, the regenerative diode $32_{UL}$ connected in parallel to the low-side FET $31_{UL}$ of the U phase that is a normal phase, the U-phase field coil 18U, and the V-phase field coil 18V. On the other hand, the second closed circuit 62 includes the low-side FET $31_{VL}$ of the V phase that has short-circuit faulted, the regenerative diode $32_{WL}$ connected in parallel to the low-side FET $31_{WL}$ f the W phase that is a normal phase, the W-phase field coil 18W, and the V-phase field coil 18V.

Therefore, when the low-side FET $31_{VL}$ of the V phase has short-circuit faulted, the "impossible region," the "possible region," and the "indeterminate region" are as follows. That is, an electric angle region in which a load current flows in both of the first closed circuit 61 and the second closed circuit 62 is the "impossible region." On the other hand, an electric angle region in which a load current flows in neither of the first closed circuit 61 and the second closed circuit 62 is the "possible region." An electric angle region in which a load current flows in either one of the first closed circuit 61 and the second closed circuit 62 is the "indeterminate region."

Figure 4:
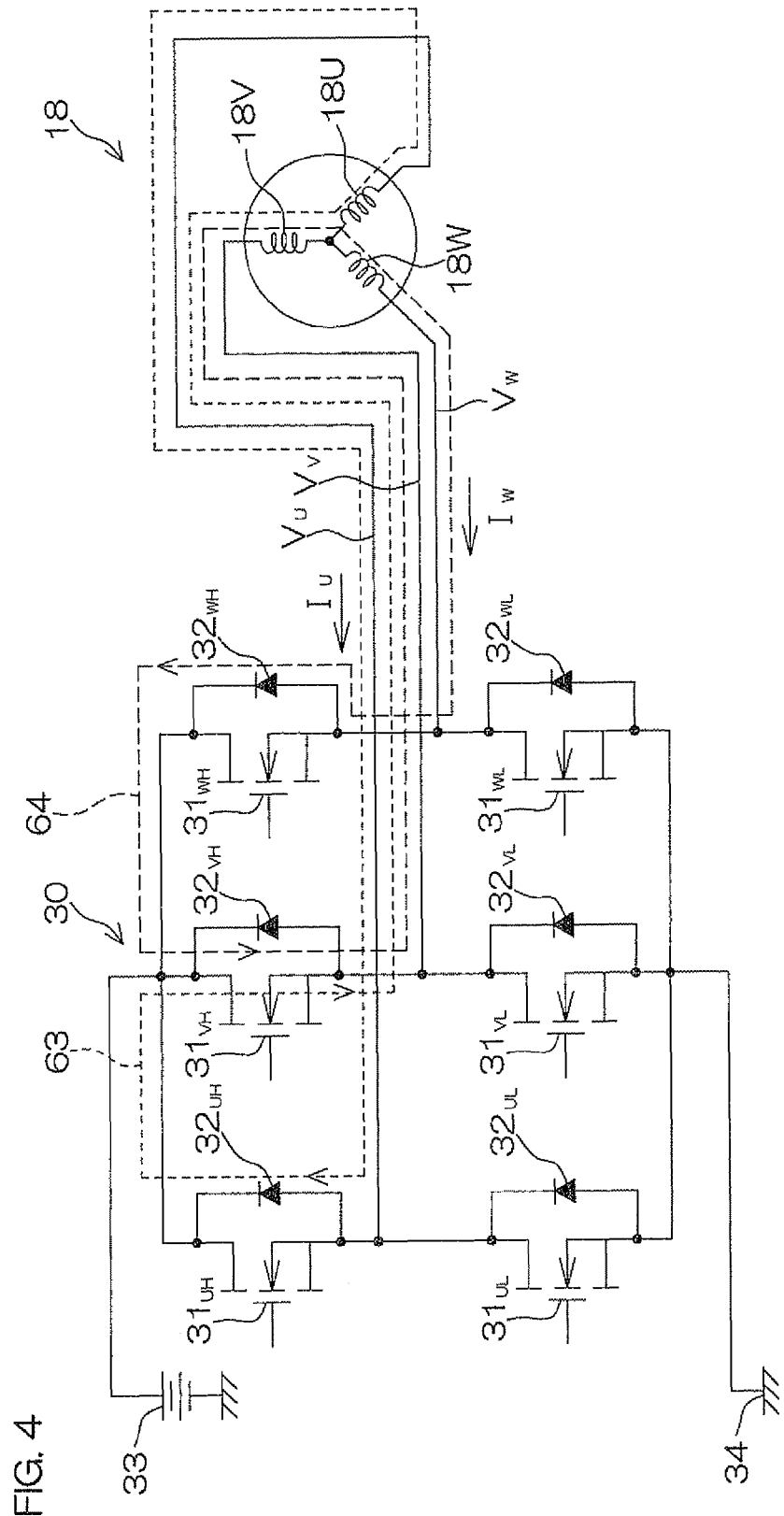
FIG. 4 is an electric circuit diagram showing closed circuits in which a load current flows when a high-side FET has short-circuit faulted.

On the other hand, as shown in FIG. 4, it is assumed that in a case where the high-side FET $31_{VH}$ of the V phase has short-circuit faulted, the rotor is rotated by driver's steering operation in the state where all other FETs are off. Then, an induced voltage is generated in the electric motor 18, and due to this induced voltage, a load current flows in the direction indicated by the arrow in a third closed circuit indicated by the reference symbol 63 and a fourth closed circuit indicated by the reference symbol 64.

The third closed circuit 63 includes the high-side FET $31_{VH}$ of the V phase that has short-circuit faulted, the V-phase field coil 18V, the U-phase field coil 18U, and the regenerative diode $32_{UH}$ connected in parallel to the high-side FET $31_{UH}$ of the U phase that is a normal phase. On the other hand, the fourth closed circuit 64 includes the high-side FET $31_{VH}$ of the V phase that has short-circuit faulted, the V-phase field coil 18V, the W-phase field coil 18W, and the regenerative diode $32_{WH}$ connected in parallel to the high-side FET $31_{WH}$ of the W phase that is a normal phase.

Therefore, when the high-side FET $31_{VH}$ of the V phase has short-circuit faulted, the "impossible region," the "possible region," and the "indeterminate region" are as follows. That is, an electric angle region in which a load current flows in both of the third closed circuit 63 and the fourth closed circuit 64 is the "impossible region." On the other hand, an electric angle region in which a load current flows in neither of the third closed circuit 63 and the fourth closed circuit 64 is the "possible region." An electric angle region in which a load current flows in either one of the third closed circuit 63 and the fourth closed circuit 64 is the "indeterminate region."

As shown in FIG. 3, in a case where the low-side FET $31_{VL}$ of the V phase has short-circuit faulted, for a load current to flow in the direction indicated by the arrow in the first closed circuit 61 including the U-phase field coil 18U, the phase voltage $V_V$ of the V phase that is a short-circuit faulted phase must be higher (larger) than the phase voltage $V_U$ of the U phase that is a normal phase. In this case, when the polarity of a current flowing from the driving circuit 30 toward the electric motor 18 is positive, the polarity of the phase current $I_U$ of the U phase that is a normal phase is positive. Similarly, for a load current to flow in the direction indicated by the arrow in the second closed circuit 62 including the W-phase field coil 18W, the phase voltage $V_V$ of the V phase that is a short-circuit faulted phase must be higher than the phase voltage $V_W$ of the W phase that is a normal phase. In this case, the polarity of the phase current $I_W$ of the W phase that is a normal phase is positive.

As shown in FIG. 4, in a case where the high-side FET $31_{VH}$ of the V phase has short-circuit faulted, for a load current to flow in the direction indicated by the arrow in the third closed circuit 63 including the U-phase field coil 18U, the phase voltage $V_V$ of the V phase that is a short-circuit faulted phase must be lower (smaller) than the phase voltage $V_U$ of the U phase that is a normal phase. In this case, the polarity of the phase current $I_U$ of the U phase that is a normal phase becomes negative. Similarly, for a load current to flow in the direction indicated by the arrow in the fourth closed circuit 64 including the W-phase field coil 18W, the phase voltage $V_V$ of the V phase that is a short-circuit faulted phase must be lower than the phase voltage $V_W$ of the W phase that is a normal phase. In this case, the polarity of the phase current $I_W$ of the W phase that is a normal phase becomes negative.

The driving unit 43 for time of short-circuit fault performs a process for driving the electric motor 18 in the "possible region" and "indeterminate region" identified by the controllable region identification unit 41.

Figure 5:
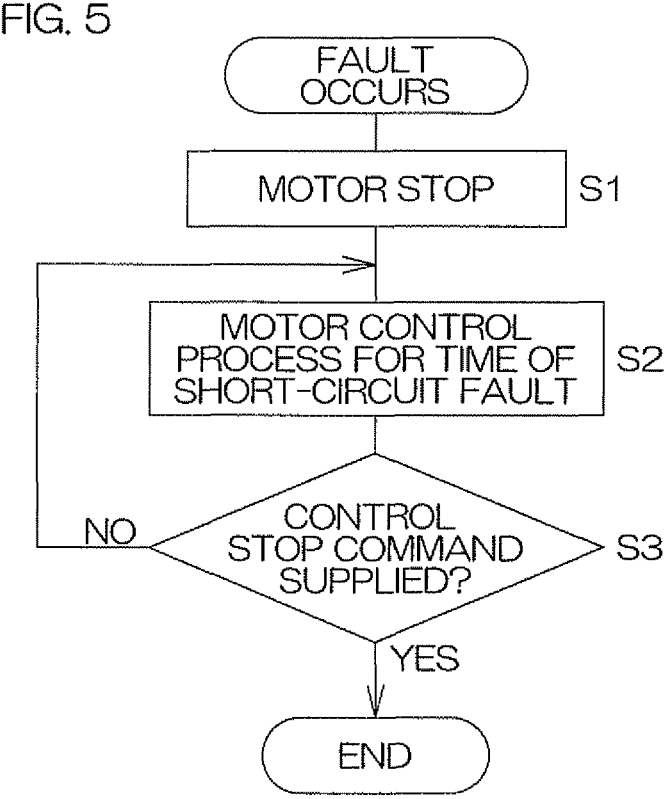
FIG. 5 is a flowchart showing operations of a control unit when a short-circuit fault has occurred.

FIG. 5 is a flowchart showing operations of the control unit 40 when a fault occurs.

When the controllable region identification unit 41 detects occurrence of an operation failure (fault) in the electric motor 18 during 180-degree energization sine wave driving of the electric motor 18 by the sine wave driving unit 42, the controllable region identification unit 41 supplies a motor stop command to the sine wave driving unit 42 (Step S1). When the sine wave driving unit 42 receives the motor stop command from the fault determination unit 41, the sine wave driving unit 42 interrupts 180-degree energization sine wave driving and turns all FETs 31 off. Accordingly, the electric motor 18 is stopped.

Thereafter, the controllable region identification unit 41 and the driving unit 43 for time of short-circuit fault perform a motor control process for the time of a short-circuit fault (Step S2). The motor control process for the time of a short-circuit fault is continuously performed until a control stop command such as a power supply turning-off command is supplied (Step S3; YES).

Figure 6:
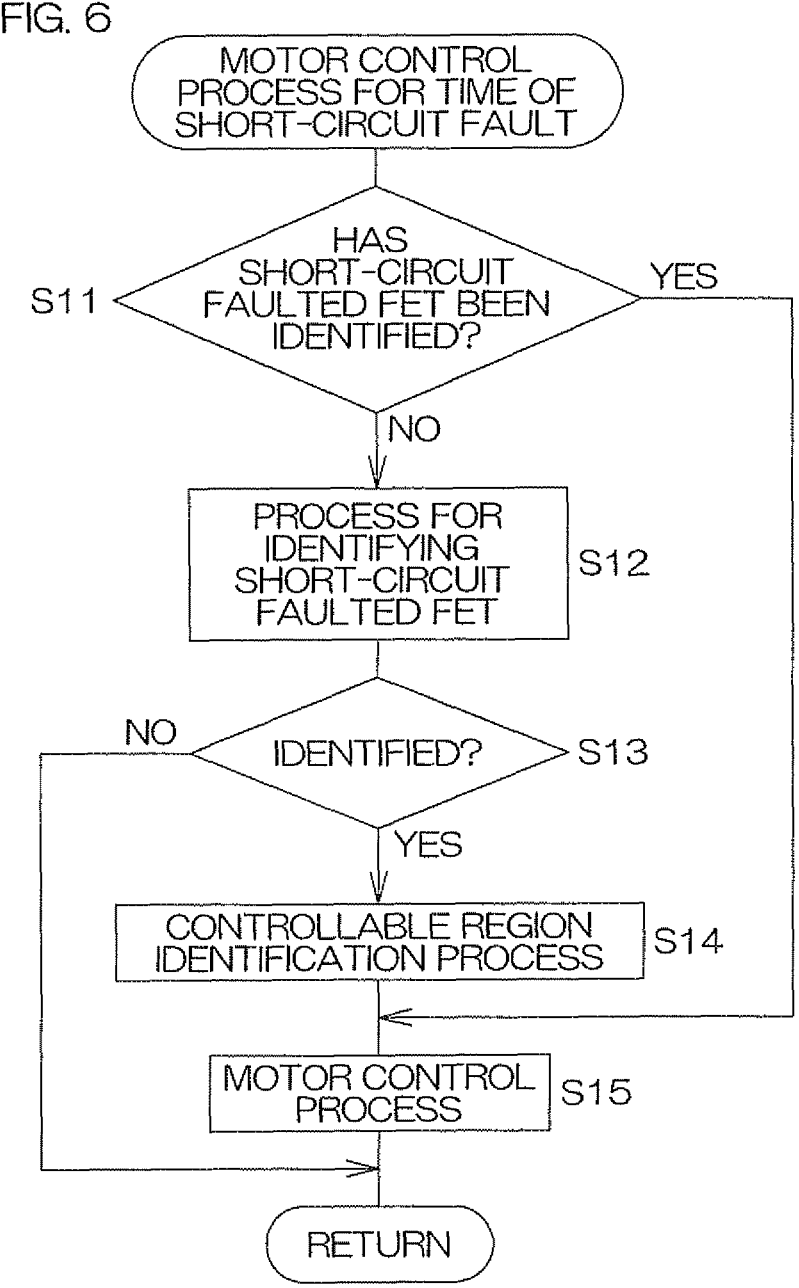
FIG. 6 is a flowchart showing detailed procedures of Step S2 in FIG. 5.

FIG. 6 is a flowchart showing procedures of a motor control process for the time of a short-circuit fault.

In the motor control process for the time of a short-circuit fault, in the case where one of the six FETs 31 has short-circuit faulted, the controllable region identification unit 41 determines whether the FET that has short-circuit faulted (the position of the FET that has short-circuit faulted) has already been identified (Step S11). Specifically, it is determined whether it has already been identified of which phase among the three phases the FET that has short-circuit faulted is, and whether the FET that has short-circuit faulted is the high-side or low-side FET. When the FET that has short-circuit faulted has not been identified (Step S11: NO), the controllable region identification unit 41 performs processes for determining whether a short-circuit fault has occurred and for identifying an FET that has short-circuit faulted when a short-circuit fault has occurred based on phase voltages (induced voltages) $V_U$, $V_V$, and $V_W$ of the phases (Step S12). In detail, first, the controllable region identification unit 41 performs a primary determination process. In the primary determination process, the controllable region identification unit 41 acquires phase voltages $V_U$, $V_V$, and $V_W$ of the phases. Then, the controllable region identification unit 41 investigates whether a first condition that any of the phase voltages is equal to or less than a predetermined ground level VG (for example, 0.5 [V]) is satisfied and whether a second condition that any of the phase voltages is equal to or more than a predetermined power supply level VB (for example, 5.0 [V]). When the first condition is satisfied, the controllable region identification unit 41 determines that the low-side FET of any of the phases has short-circuit faulted. When the second condition is satisfied, the controllable region identification unit 41 determines that the high-side FET of any of the phases has short-circuit faulted. When neither of the first condition and the second condition is satisfied, the controllable region identification unit 41 determines that a short-circuit fault has not occurred.

When it could be identified whether the FET that has short-circuit faulted is the high-side FET or the low-side FET through the primary determination process, the controllable region identification unit 41 performs a secondary determination process. In the secondary determination process, the controllable region identification unit 41 applies a current to the electric motor 18 by controlling the FETs 31 according to an electric angle (forced commutation control). Then, the controllable region identification unit 41 monitors the phase voltages $V_U$, $V_V$, and $V_W$ of the phases, and based on waveforms of these voltages, identifies a phase (short-circuit faulted phase) of the FET that has short-circuit faulted. Accordingly, an FET that has short-circuit faulted can be identified.

In a case where an FET that has short-circuit faulted cannot be identified by the process of Step S12 (including the case where a short-circuit fault has not occurred) (Step S13: NO), the process shifts to Step S3 in FIG. 5. In Step S3, when a control end command is not supplied, the process returns to Step S11. When it has already been identified whether the FET that has short-circuit faulted is the high-side FET or the low-side FET at the time of start of the process of Step S12, the controllable region identification unit 41 starts the secondary determination process without performing the first determination process.

When an FET that has short-circuit faulted could be identified by the process of Step S12 (Step S13: YES), the controllable region identification unit 41 performs a controllable region identification process (Step S14). In detail, the controllable region identification unit 41 identifies a "possible region," an "indeterminate region," and an "impossible region" corresponding to the FET that has short-circuit faulted and the direction in which the electric motor 18 should be rotated. The direction of rotation in which the electric motor 18 should be rotated is determined based on, for example, an output signal of the torque sensor 11 as described later. Details of the controllable region identification process are described later. When the regions ("possible region," "indeterminate region," and "impossible region) corresponding to the FET that has short-circuit faulted and the direction in which the electric motor 18 should be rotated are identified by the controllable region identification process, the controllable region identification unit 41 and the driving unit 43 for time of short-circuit fault perform motor control corresponding to a region to which the current electric angle belongs among the identified "possible region," "indeterminate region," and "impossible region" (Step S15). In detail, when the current electric angle belongs to the "possible region" or "indeterminate region," the driving unit 43 for time of short-circuit fault drives the electric motor 18. When the current electric angle belongs to the "impossible region," the driving unit 43 for time of short-circuit fault does not drive the electric motor 18. Details of the process of Step S15 are described later.

In the Step S11, when it is determined that the FET that has short-circuit faulted has already been identified (Step S11: YES), based on the direction in which the electric motor 18 should be rotated and predetermined information that has already been identified, the controllable region identification unit 41 identifies the regions ("possible region," "indeterminate region," and "impossible region") corresponding to the FET that has short-circuit faulted and the direction in which the electric motor 18 should be rotated, and then the process shifts to Step S15. When the first or second method described later is adopted in Step S14, the predetermined information is information showing the regions ("possible regions," "indeterminate regions," and "impossible regions") by direction of rotation corresponding to the short-circuit faulted FET that has already been identified in Step S14. When the third method described later is adopted in Step S14, the predetermined information is the short-circuit faulted FET that has already been identified and map data (map data shown in FIG. 9) to be adopted in the third method. When the fourth method described later is adopted in Step S14, the predetermined information is the short-circuit faulted FET that has already been identified and map data to be adopted in the fourth method (map data showing the "possible region," "indeterminate region," and "impossible region" corresponding to a case where any one of the FETs 31 has short-circuit faulted while the electric motor 18 is rotated in either one of direction of rotation).

The controllable region identification process in Step S14 is described. As a method for identifying the controllable region, the following three methods are available.

(a) Method for identifying a controllable region based on phase voltages (induced voltages) (hereinafter, referred to as "first method")

(b) Method for identifying a controllable region based on phase currents (load currents) (hereinafter, referred to as "second method")

(c) Method for identifying a controllable region based on the position of an FET that has short-circuit faulted and a map created in advance. This method includes two methods, one is referred to as a third method and the other is referred to as a fourth method.

In the first method and the second method, a controllable region is identified in a state where induced voltages are generated. Accordingly, the rotor must be rotated. Therefore, when the electric motor 18 is rotated by driver's steering operation, a controllable region can be identified in this state, however, when the electric motor 18 is not rotated by a steering operation, the controllable region identification unit 41 must forcibly rotationally drive the electric motor 18 by controlling the FETs 31 according to an electric angle. On the other hand, according to the third method and the fourth method, a controllable region is identified based on a map created in advance, so that the rotor does not need to be rotated.

The first method is described. The direction of rotation of the electric motor 18 includes a forward (CW: clockwise) direction and a reverse (CCW: counterclockwise) direction. Between the forward direction and the reverse direction, the induced voltage waveforms of the phases differ even when the FET that has short-circuit faulted is the same, so that the controllable region differs between the directions, however the concept of the method for identifying a controllable region is the same. Here, the case where the direction of rotation of the rotor is the forward direction is described. For example, when the electric motor 18 is rotated by a steering operation, the direction of rotation of the electric motor 18 can be identified based on a change in electric angle detected by the rotation angle sensor 52. For example, when the electric angle changes to increase, the direction of rotation of the electric motor 18 is identified as the forward direction, and when the electric angle changes to decrease, the direction of rotation of the electric motor 18 is identified as the reverse direction.

Figure 7A:
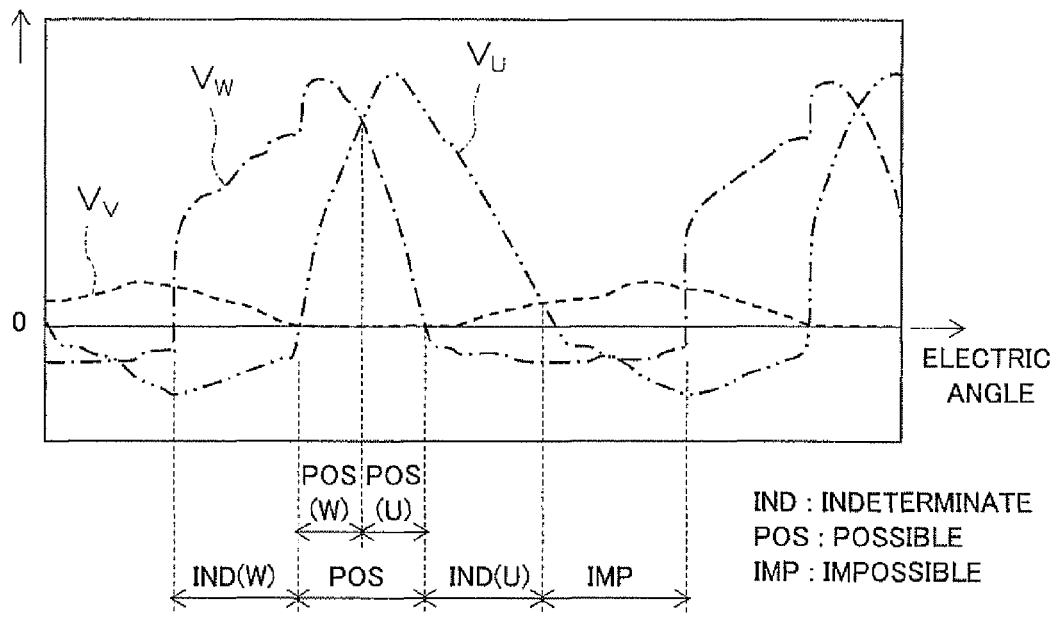
FIG. 7A is an explanatory view for describing a method (first method) for identifying a controllable region.
Figure 7B:
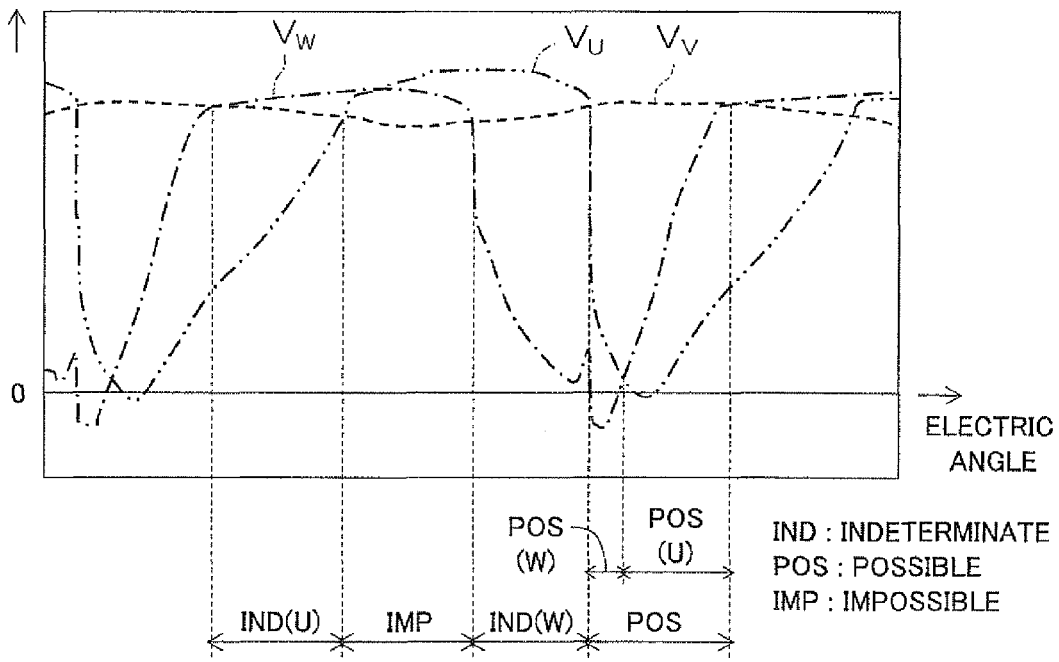
FIG. 7B is an explanatory view for describing the method (first method) for identifying a controllable region.

The case where the FET that has short-circuit faulted is a low-side FET and the case where the FET that has short-circuit faulted is a high-side FET are described separately. First, the case where a low-side FET has short-circuit faulted is described. Here, as shown in FIG. 3, the case where the low-side FET $31_{VL}$ of the V phase has short-circuit faulted is described by way of example. FIG. 7A shows phase voltages (induced voltages) $V_U$, $V_V$, and $V_W$ of the phases when the rotor of the electric motor 18 is rotated in the forward direction by a steering operation in the case where the low-side FET $31_{VL}$ of the V phase has short-circuit faulted.

The controllable region identification unit 41 identifies an electric angle region in which the phase voltages $V_U$ and $V_W$ of both normal phases (U phase and the W phase) become equal to or less than the phase voltage $V_V$ of the short-circuit faulted phase (V phase in this example) (an electric angle region in which a load current flows in both of the first and second closed circuits 61 and 62) as an "impossible region." The electric angle is obtained from the rotation angle sensor 52.

The controllable region identification unit 41 identifies an electric angle region in which the phase voltages $V_U$ and $V_W$ of both normal phases (U phase and W phase) become larger than the phase voltage $V_V$ of the short-circuit faulted phase (V phase in this example) (an electric angle region in which a load current flows in neither of the first and second closed circuits 61 and 62) as a "possible region." In a case where the FET that has short-circuit faulted is a low-side FET, when two normal phases are indicated as A and B, in the "possible region," the controllable region identification unit 41 may identify an electric angle region in which the phase voltage of one normal phase A becomes equal to or more than the phase voltage of the other normal phase B as a "possible region (A)" and identify an electric angle region in which the phase voltage of the other normal phase B becomes larger than the phase voltage of the one normal phase A as a "possible region (B)." In the example described above, in the "possible region," the controllable region identification unit 41 may identify an electric angle region in which the phase voltage $V_U$ of the U phase becomes equal to or more than the phase voltage $V_W$ of the W phase as a "possible region (U)," and identify an electric angle region in which the phase voltage $V_W$ of the W phase becomes larger than the phase voltage $V_U$ of the U phase as a "possible region (W)."

The controllable region identification unit 41 identifies an electric angle region in which the phase voltage of either one of the normal phases (U phase and W phase) becomes larger than the phase voltage $V_V$ of the short-circuit faulted phase (V phase in this example) and the phase voltage of the other normal phase becomes equal to or less than the phase voltage $V_V$ of the short-circuit faulted phase (an electric angle region in which a load current flows in either one of the first and second closed circuits 61 and 62) as an "indeterminate region." In a case where the FET that has short-circuit faulted is a low-side FET, when the two normal phases are indicated as A and B and the faulted phase is indicated as C, in the "indeterminate region," the controllable region identification unit 41 may identify an electric angle region in which the phase voltage of one normal phase A becomes larger than the phase voltage of the faulted phase C as an "indeterminate region (A)," and identify an electric angle region in which the phase voltage of the other normal phase B becomes larger than the phase voltage of the faulted phase C as an "indeterminate region (B)."

In the example described above, the controllable region identification unit 41 may identify an electric angle region in which the phase voltage $V_U$ of the U phase that is a normal phase becomes larger than the phase voltage $V_V$ of the V phase and the phase voltage $V_V$ of the W phase that is a normal phase becomes equal to or less than the phase voltage $V_V$ of the V phase (an electric angle region in which a load current flows in only the second closed circuit 62 including the W-phase field coil 18W of the first and second closed circuits 61 and 62) as an "indeterminate region (U)." On the other hand, the controllable region identification unit 41 may identify an electric angle region in which the phase voltage $V_W$ of the W phase that is a normal phase becomes larger than the phase voltage $V_V$ of the V phase and the phase voltage $V_U$ of the U phase that is a normal phase becomes equal to or less than the phase voltage $V_V$ of the V phase (an electric angle region in which a load current flows in only the first closed circuit 61 including the U-phase field coil 18U of the first and second closed circuits 61 and 62) as an "indeterminate region (W)."

The case where a high-side FET has short-circuit faulted is described. Here, as shown in FIG. 4, the case where the high-side FET $31_{VH}$ of the V phase has short-circuit faulted is described by way of example. FIG. 773 shows phase voltages (induced voltages) $V_U$, $V_V$, and $V_W$ of the phases when the rotor of the electric motor 18 is rotated in the forward direction by a steering operation in the case where the high-side FET $31_{VH}$ of the V phase has short-circuit faulted.

The controllable region identification unit 41 identifies an electric angle region in which the phase voltages $V_U$ and $V_W$ of both normal phases (U phase and W phase) become equal to or more than the phase voltage $V_V$ of the short-circuit faulted phase (V phase in this example) (an electric angle region in which a load current flows in both of the third and fourth closed circuits 63 and 64) as an "impossible region."

The controllable region identification unit 41 identifies an electric angle region in which the phase voltages $V_U$ and $V_W$ of both normal phases (U phase and W phase) become smaller than the phase voltage $V_V$ of the short-circuit faulted phase (V phase in this example) (an electric angle region in which a load current flows in neither of the third and fourth closed circuits 63 and 64) as a "possible region." In the case where the FET that has short-circuit faulted is a high-side FET, when the two normal phases are indicated as A and B, in the "possible region," the controllable region identification unit 41 may identify an electric angle region in which the phase voltage of one normal phase A becomes equal to or less than the phase voltage of the other normal phase B as a "possible region (A)," and identify an electric angle region in which the phase voltage of the other normal phase B becomes smaller than the phase voltage of the one normal phase A as an "possible region (B)." In the example described above, in the "possible region," the controllable region identification unit 41 may identify an electric angle region in which the phase voltage $V_U$ of the U phase becomes equal to or less than the phase voltage $V_W$ of the W phase as a "possible region (U)," and identify an electric angle region in which the phase voltage $V_W$ of the W phase becomes smaller than the phase voltage $V_U$ of the U phase as a "possible region (W)."

The controllable region identification unit 41 identifies an electric angle region in which the phase voltage of either one of the normal phases (U phase and W phase) becomes smaller than the phase voltage $V_V$ of the short-circuit faulted phase (V phase in this example) and the phase voltage of the other normal phase becomes equal to or more than the phase voltage $V_V$ of the short-circuit faulted phase (an electric angle region in which a load current flows in either one of the third and fourth closed circuits 63 and 64) as an "indeterminate region." In the case where the FET that has short-circuit faulted is a high-side FET, when the two normal phases are indicated as A and B and the faulted phase is indicated as C, in the "indeterminate region," the controllable region identification unit 41 may identify an electric angle region in which the phase voltage of one normal phase A becomes smaller than the phase voltage of the faulted phase C as an "indeterminate region (A)" and identify an electric angle region in which the phase voltage of the other normal phase B becomes smaller than the phase voltage of the faulted phase C as an "indeterminate region (B)."

In the example described above, the controllable region identification unit 41 may identify an electric angle region in which the phase voltage $V_U$ of the U phase that is a normal phase becomes smaller than the phase voltage $V_V$ of the V phase and the phase voltage $V_W$ of the W phase that is a normal phase becomes equal to or more than the phase voltage $V_V$ of the V phase (an electric angle region in which a load current flows in only the fourth closed circuit 64 including the W-phase field coil 18W of the third and fourth closed circuits 63 and 64) as an "indeterminate region (U)." On the other hand, the controllable region identification unit 41 may identify an electric angle region in which the phase voltage V of the W phase that is a normal phase becomes smaller than the phase voltage $V_V$ of the V phase and the phase voltage $V_U$ of the U phase that is a normal phase becomes equal to or more than the phase voltage $V_V$ of the V phase (an electric angle region in which a load current flows in only the third closed circuit 63 including the U-phase field coil 18U of the third and fourth closed circuits 63 and 64) as an "indeterminate region (W)."

In the case where the "possible region," "indeterminate region," and "impossible region" when the electric motor 18 is rotated in either one direction of rotation of the forward direction and the reverse direction by, for example, a driver's steering operation are thus identified, the controllable region identification unit 41 identifies the "possible region," "indeterminate region," and "impossible region" when the electric motor 18 is rotated in the other direction of rotation. As described later, the "possible region," "indeterminate region," and "impossible region" when the electric motor 18 is rotated in the forward direction and the "possible region," "indeterminate region," and "impossible region" when the electric motor 18 is rotated in the reverse direction are different from each other by 180 degrees in terms of electric angle. Therefore, in a case where the "possible region," "indeterminate region," and "impossible region" when the electric motor 18 is rotated in one direction of rotation have been identified, the "possible region," "indeterminate region," and "impossible region" when the electric motor 18 is rotated in the other direction of rotation can be identified based on the identified "possible region," "indeterminate region," and "impossible region."

For example, it is assumed that the regions ("possible region," "indeterminate region," and "impossible region")

when the electric motor 18 is rotated in the forward direction by a driver's steering operation have been identified. In this case, by converting electric angles that regulate these regions (hereinafter, referred to as "region regulating electric angles α") based on the following equation (1), the regions ("possible region," "indeterminate region," and "impossible region") when the electric motor 18 is rotated in the reverse direction can be identified.

In the case of $180° \le \alpha < 360°$, $\alpha = \alpha - 180°$

In the case of $0 \le \alpha < 180°$, $\alpha = \alpha - 180° + 360°$ \hfill (1)

On the other hand, it is assumed that the regions ("possible region," "indeterminate region," and "impossible region") when the electric motor 18 is rotated in the reverse direction by a driver's steering operation have been identified. In this case, by converting electric angles that regulate these regions (region regulating electric angles α) based on the following equation (2), the regions ("possible region," "indeterminate region," and "impossible region") when the electric motor 18 is rotated in the forward direction can be identified.

In the case of $180° \le \alpha < 360°$, $\alpha = \alpha + 180° - 360°$

In the case of $0 \le \alpha < 180°$, $\alpha = \alpha + 180°$ \hfill (2)

The controllable region identification unit 41 identifies the "possible region," "indeterminate region," and "impossible region" corresponding to the FET that has short-circuit faulted and the direction of rotation in which the electric motor 18 should be rotated based on the direction of rotation in which the electric motor 18 should be rotated and the regions ("possible region," "indeterminate region," and "impossible region") corresponding to the forward direction and the regions ("possible region," "indeterminate region," and "impossible region") corresponding to the reverse direction identified by the first method.

The direction of rotation in which the electric motor 18 should be rotated is determined based on, for example, an output signal of the torque sensor 11. In detail, based on whether the output signal of the torque sensor 11 indicates a clockwise steering torque or a counterclockwise steering torque, the direction in which the electric motor 18 should be rotated is determined. Specifically, when the output signal of the torque sensor 11 indicates a clockwise steering torque, a direction of rotation for generating a torque that assists clockwise steering is determined as the direction of rotation in which the electric motor 18 should be rotated. On the other hand, when the output signal of the torque sensor 11 indicates a counterclockwise steering torque, a direction of rotation for generating a torque that assists counterclockwise steering is determined as the direction of rotation in which the electric motor 18 should be rotated.

Next, the second method is described. When the second method is applied, as shown by the dashed lines in FIG. 2, phase currents detected by the current sensors 51$_U$, 51$_V$, and 51$_W$ are input into the controllable region identification unit 41. Between the case where the electric motor 18 is rotated in the forward direction and the case where the electric motor 18 is rotated in the reverse direction, the induced voltage waveforms of the phases differ even when the FET that has short-circuit faulted is the same, so that the controllable region differs between the directions, however, the concept of the method for identifying a controllable region is the same. Here, the case where the direction of rotation of the rotor is the forward direction is described.

Figure 8A:
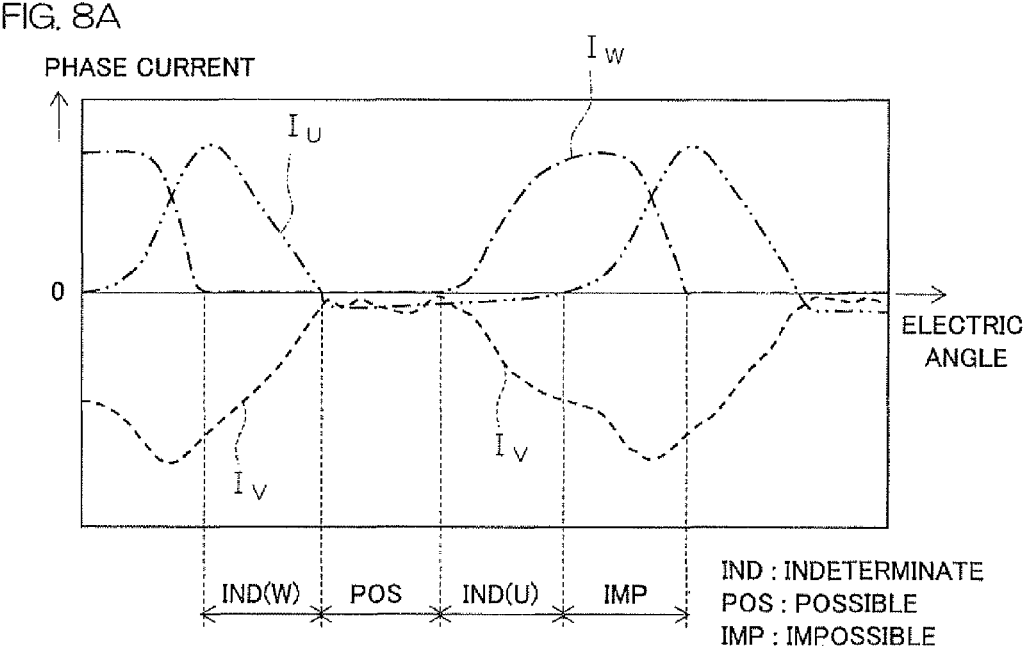
FIG. 8A is an explanatory view for describing a method (second method) for identifying a controllable region.

The case where the FET that has short-circuit faulted is a low-side FET and the case where the FET that has short-circuit faulted is a high-side FET are described separately. First, the case where a low-side FET has short-circuit faulted is described. Here, as shown in FIG. 3, a case where the low-side FET 31$_{VL}$ of the V phase has short-circuit faulted is described by way of example. FIG. 8A shows phase currents $I_U$, $I_V$, and $I_W$ of the phases when the rotor of the electric motor 18 is rotated in the forward direction by a steering operation in the case where the low-side FET 31$_{VL}$ of the V phase has short-circuit faulted.

The controllable region identification unit 41 identifies an electric angle region in which the phase currents $I_U$ and $I_W$ of both U phase and W phase that are normal phases become larger than zero (an electric angle region in which a load current flows in both of the first and second closed circuits 61 and 62) as an "impossible region." The controllable region identification unit 41 identifies an electric angle region in which the phase currents $I_U$ and $I_W$ of both U phase and W phase that are normal phases become zero or less (an electric angle region in which a load current flows in neither of the first and second closed circuits 61 and 62) as a "possible region."

The controllable region identification unit 41 identifies an electric angle region in which the phase current of either one of the normal phases (U phase and W phase) becomes zero or less and the phase current of the other normal phase becomes larger than zero as an "indeterminate region." In the case where the FET that has short-circuit faulted is a low-side FET, when the two normal phases are indicated as A and B, in the "indeterminate region," the controllable region identification unit 41 may identify an electric angle region in which the phase current of one normal phase A becomes zero or less as an "indeterminate region (A)," and identify an electric angle region in which the phase current of the other normal phase B becomes zero or less as an "indeterminate region (B)."

In the example described above, the controllable region identification unit 41 may identify an electric angle region in which the phase current $I_U$ of the U phase that is a normal phase becomes zero or less and the phase current $I_W$ of the W phase that is a normal phase becomes larger than zero (an electric angle region in which a load current flows in only the second closed circuit 62 including the W-phase field coil 18W of the first and second closed circuits 61 and 62) as an "indeterminate region (U)." On the other hand, the controllable region identification unit 41 may identify an electric angle region in which the phase current $I_W$ of the W phase that is a normal phase becomes zero or less and the phase current $I_U$ of the U phase that is a normal phase becomes larger than zero (an electric angle region in which a load current flows in only the first closed circuit 61 including the U-phase field coil 18U of the first and second closed circuits 61 and 62) as an "indeterminate region (W)."

Figure 8B:
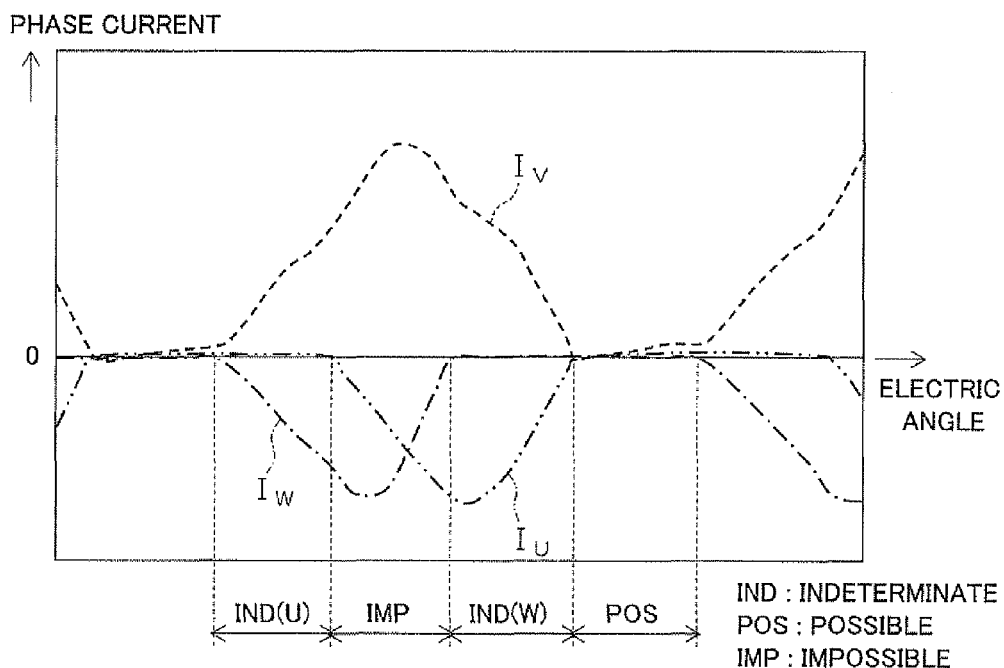
FIG. 8B is an explanatory view for describing the method (second method) for identifying a controllable region.

The case where a high-side FET has short-circuit faulted is described. Here, as shown in FIG. 4, the case where the high-side FET 31$_{VH}$ of the V phase has short-circuit faulted is described by way of example. FIG. 8B shows phase currents $I_U$, $I_V$, and $I_W$ when the rotor of the electric motor 18 is rotated in the forward direction by a steering operation in the case where the high-side FET 31$_{VH}$ of the v phase has short-circuit faulted.

The controllable region identification unit 41 identifies an electric angle region in which the phase currents $I_U$ and $I_W$ of both U phase and W phase that are normal phases become smaller than zero (an electric angle region in which a load current flows in both of the third and fourth closed circuits 63 and 64) as an "impossible region." The controllable region identification unit 41 identifies an electric angle region in which the phase currents $I_U$ and $I_W$ of both U phase and W phase that are normal phases become zero or more (an electric angle region in which a load current flows in neither of the third and fourth closed circuits 63 and 64) as a "possible region."

The controllable region identification unit 41 identifies an electric angle region in which the polarity of the phase current of either one of the normal phases (U phase and W phase) becomes zero or more and the phase current of the other normal phase becomes smaller than zero as an "indeterminate region." In the case where the FET that has short-circuit faulted is a high-side FET, when the two normal phases are indicated as A and B, in the "indeterminate region," the controllable region identification unit 41 may identify an electric angle region in which the phase current of one normal phase A becomes zero or more as an "indeterminate region (A)," and identify an electric angle region in which the phase current of the other normal phase B becomes zero or more as an "indeterminate region (B)."

In the example described above, the controllable region identification unit 41 may identify an electric angle region in which the phase current $I_U$ of the U phase that is a normal phase becomes zero or more and the phase current $I_W$ of the W phase that is a normal phase becomes smaller than zero (an electric angle region in which a load current flows in only the fourth closed circuit 64 including the W-phase field coil 18W of the third and fourth closed circuits 63 and 64) as an "indeterminate region (U)." On the other hand, the controllable region identification unit 41 may identify an electric angle region in which the phase current $I_W$ of the W phase that is a normal phase becomes zero or more and the phase current $I_U$ of the U phase that is a normal phase becomes smaller than zero (an electric angle region in which a load current flows in only the third closed circuit 63 including the U-phase field coil 18U of the third and fourth closed circuits 63 and 64) as an "indeterminate region (W)."

As described above, for example, when the "possible region," "indeterminate region," and "impossible region" when the electric motor 18 is rotated in either one direction of rotation of the forward direction and the reverse direction by a driver's steering operation are identified, the controllable region identification unit 41 identifies the "possible region," "indeterminate region," and "impossible region" when the electric motor 18 is rotated in the other direction of rotation by the same manner as in the first method.

The controllable region identification unit 41 identifies the "possible region," "indeterminate region," and "impossible region" corresponding to the FET that has short-circuit faulted and the direction of rotation in which the electric motor 18 should be rotated based on the direction of rotation in which the electric motor 18 should be rotated and the regions ("possible region," "indeterminate region," and "impossible region") corresponding to the forward direction and the regions ("possible region," "indeterminate region," and "impossible region") corresponding to the reverse direction identified by the second method. The direction of rotation in which the electric motor 18 should be rotated is determined based on, for example, an output signal of the torque sensor 11.

The third method is described. In the third method, a map showing the "possible region," "indeterminate region," and "impossible region" corresponding to each case where each FET has short-circuit faulted according to the direction of rotation (CW, CCW) of the electric motor 18 and the FET is created in advance and stored in a nonvolatile memory.

FIG. 9 shows an example of contents in such a map. In FIG. 9, CW and CCW denote the directions of rotation of the electric motor 18 when the electric motor 18 is driven in Step S15 in FIG. 6, and CW indicates the forward direction, and CCW indicates the reverse direction. U, V, W, upper and lower denote the position of the FET that has short-circuit faulted. Specifically, each of U, V, and W denotes a phase corresponding to the FET that has short-circuit faulted. "Upper" indicates that the FET that has short-circuit faulted is an upper FET (high-side FET), and "lower" indicates that the FET that short-circuit faulted is a lower FET (low-side FET). This map is created based on theoretical values or measured data.

The controllable region identification unit 41 identifies the "possible region," "indeterminate region," and "impossible region" corresponding to the FET that has short-circuit faulted and the direction in which the electric motor 18 should be rotated based on the direction of rotation in which the electric motor 18 should be rotated, the position of the FET 31 that has short-circuit faulted, and the map. The direction of rotation in which the electric motor 18 should be rotated is determined based on, for example, an output signal of the torque sensor 11.

Figure 10:
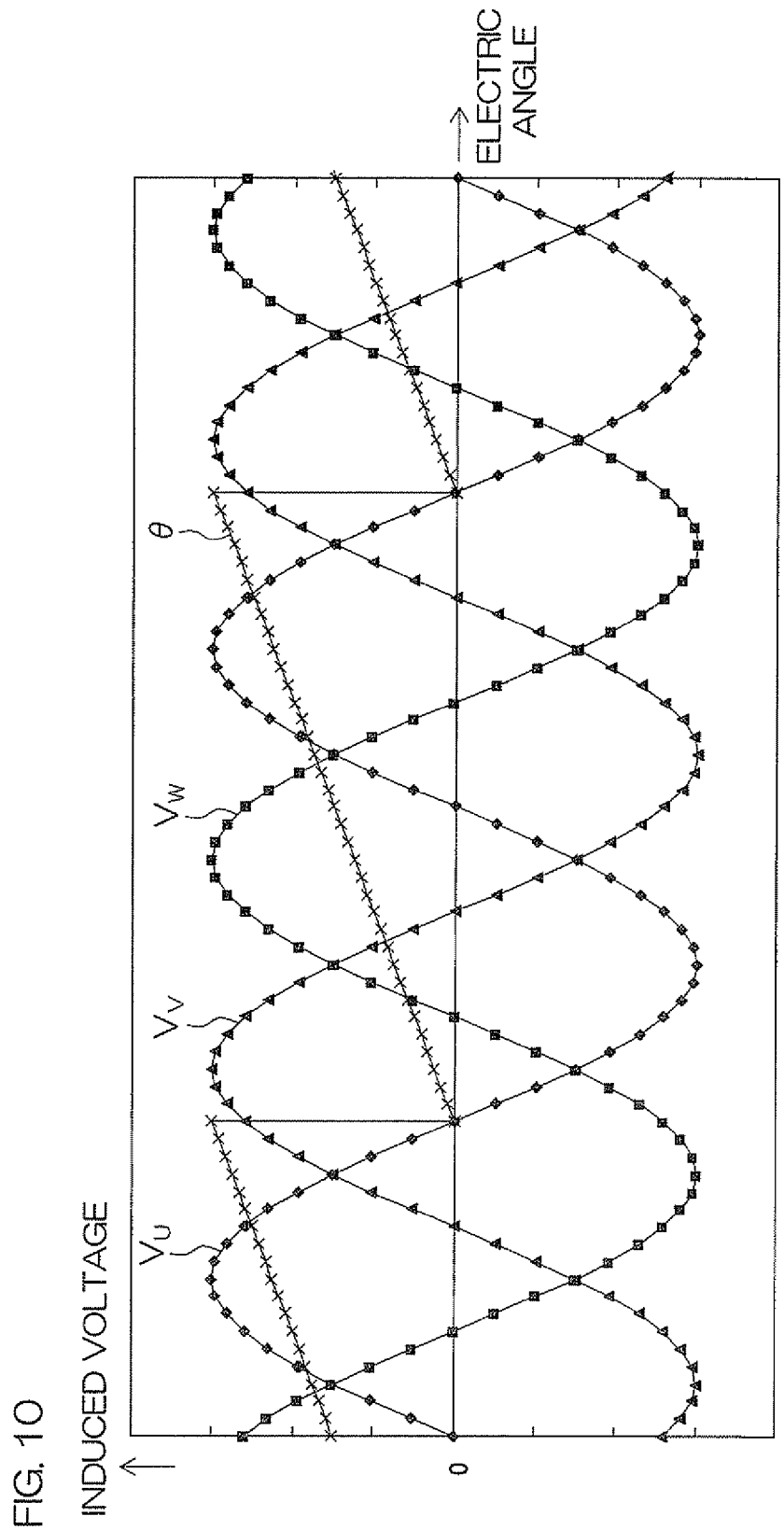
FIG. 10 is an explanatory view for describing the method (third method) for identifying a controllable region.

The case where the map is created based on theoretical values is described. FIG. 10 shows theoretical values (simulation values) of induced voltage waveforms $V_U$, $V_V$, and $V_W$ of the phases and the electric angle θ in normal driving. In this example, the direction of rotation is the forward (CW) direction. In this example, a point at which the induced voltage waveform of the U phase changes from positive to negative in normal driving is set as an electric angle θ of 0°.

The theoretical values $V_U$, $V_V$, $V_W$ of induced voltages of the phases in normal driving are expressed by the following equations (3) provided that E is an amplitude.

$$V_u = E \cdot \sin(\theta - \pi)$$

$$V_V = E \cdot \sin(\theta - \pi - (2/3)\pi)$$

$$V_W = E \cdot \sin(\theta - \pi + (2/3)\pi) \quad (3)$$

FIG. 11A shows theoretical values (simulation values) of induced voltage waveforms $V_U'$, $V_V'$, and $V_W'$ of the phases with respect to the electric angle θ when it is assumed that the low-side FET $31_{VL}$ of the V phase has short-circuit faulted. In this example, it is assumed that the direction of rotation of the electric motor 18 is the forward (CW) direction. Theoretical values of induced voltages $V_U'$, $V_V'$, and $V_W'$ of the phases when it is assumed that the low-side FET $31_{VL}$ of the V phase has short-circuit faulted are expressed by the following equations (4) by using the theoretical values $V_U$, $V_V$, and $V_W$ of the induced voltages of the phases in normal driving.

$$V_u' = V_u - V_v$$

$$V_V' = 0$$

$$V_W' = V_W - V_v \quad (4)$$

Based on the theoretical values shown in FIG. 11A, a controllable region in the case where the low-side FET $31_{VL}$ of the V phase has short-circuit faulted is obtained in advance. In detail, an electric angle region (in this example, 150° to) 270° in which the induced voltages $V_U'$ and $V_W'$ of both normal phases (U phase and V phase) become larger than the induced voltage $V_V'$ of the short-circuit faulted phase (V phase) is obtained as a "possible region." In particular, in the "possible region," a region (in this example, 210° to 270°) in which the induced voltage $V_U'$ of the U phase becomes equal to or more than the induced voltage $V_W'$ of the W phase is obtained as a "possible region (U)," and a region (in this example, 150° to) 210° in which the induced voltage $V_W'$ of the W phase becomes equal to or more than the induced voltage $V_U'$ of the U phase is obtained as a "possible region (W)." An electric angle region (330° to 90° in this example) in which the induced voltages $V_U'$ and $V_W'$ of both normal phases (U phase and V phase) become equal to or less than the induced voltage $V_V'$ of the short-circuit faulted phase (V phase) is obtained as an "impossible region."

Then, electric angle regions (90° to 150° and 270° to 330°) between the "possible region" and the "impossible region" are obtained as "indeterminate regions." In particular, of the "indeterminate regions," the electric angle region (270° to 330°) in which the induced voltage $V_U'$ of the U phase becomes larger than the induced voltage $V_V'$ of the short-circuit faulted phase (V phase) is obtained as an "indeterminate region (U)," and the electric angle region (90° to 150°) in which the induced voltage $V_W'$ of the W phase becomes larger than the induced voltage $V_V'$ of the short-circuit faulted phase (V phase) is obtained as an "indeterminate region (W)."

Figure 11B:
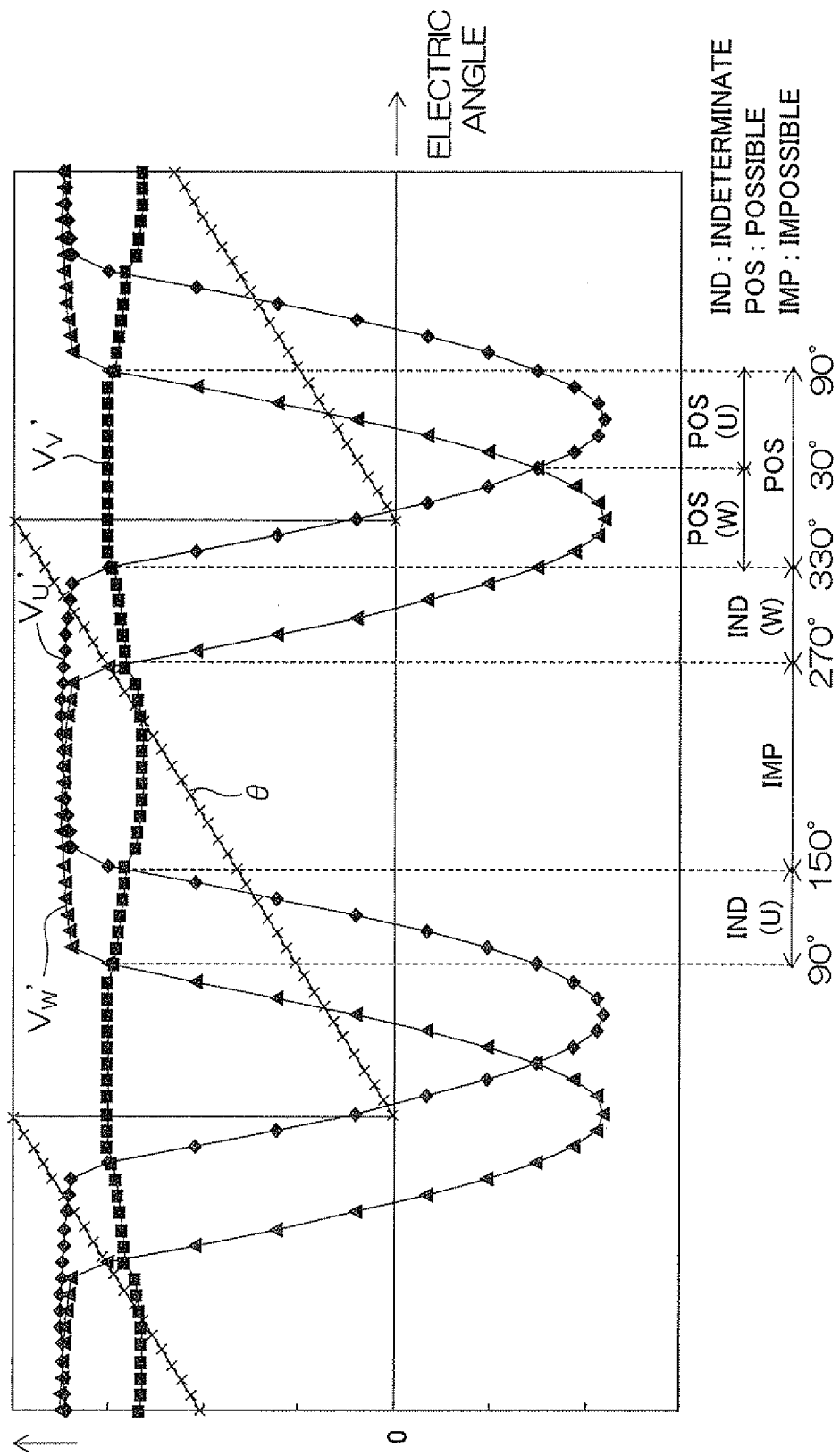
FIG. 11B is an explanatory view for describing the method (third method) for identifying a controllable region.

FIG. 11B shows theoretical values (simulation values) of the induced voltage waveforms $V_U'$, $V_V'$, and $V_W'$ of the phases with respect to the electric angle θ when it is assumed that the high-side FET $31_{VH}$ of the V phase has short-circuit faulted. In this example, it is assumed that the direction of rotation of the electric motor 18 is the forward (CW) direction. Based on the theoretical values shown in FIG. 11B, a controllable region when the high-side FET $31_{VH}$ of the V phase has short-circuit faulted is obtained in advance.

In detail, an electric angle region (330° to 90° in this example) in which the induced voltages $V_U'$ and $V_W'$ of both normal phases (U phase and V phase) become smaller than the induced voltage $V_V'$ of the short-circuit faulted phase (V phase) is obtained as a "possible region." In particular, in the "possible region," a region (30° to 90° in this example) in which the induced voltage $V_U'$ of the U phase becomes equal to or less than the induced voltage $V_W'$ of the W phase is obtained as a "possible region (U)," and a region (330° to 30° in this example) in which the induced voltage $V_W'$ of the W phase becomes smaller than the induced voltage $V_U'$ of the U phase is obtained as a "possible region (W)." Further, an electric angle region (150° to 270° in this example) in which the induced voltages $V_U'$ and $V_W'$ of both normal phases (U phase and V phase) become equal to or more than the induced voltage $V_V'$ of the short-circuit faulted phase (V phase) is obtained as an "impossible region."

Electric angle regions (90° to 150° and 270° to 330°) between the "possible region" and the "impossible region" are obtained as "indeterminate regions." In particular, of the "indeterminate regions," the electric angle region (90° to 150°) in which the induced voltage $V_U'$ of the U phase becomes smaller than the induced voltage $V_V'$ of the short-circuit faulted phase (V phase) is obtained as an "indeterminate region (U)," and the electric angle region (270° to 330°) in which the induced voltage $V_W'$ of the W phase becomes smaller than the induced voltage $V_V'$ of the short-circuit faulted phase (V phase) is obtained as an "indeterminate region (W)."

Similarly, in the case where the direction of rotation of the electric motor 18 is the forward direction (CW), the regions when the low-side FET $31_{UL}$ of the U phase has short-circuit faulted, the regions when the high-side FET $31_{UH}$ of the U phase has short-circuit faulted, the regions when the low-side FET $31_{WL}$ of the W phase has short-circuit faulted, and the regions when the low-side FET $31_{WL}$ of the W phase has short-circuit faulted are obtained. Based on the regions thus obtained, a map when the direction of rotation of the electric motor 18 is the forward (CW) direction is created in advance. By the same method, a map when the direction of rotation of the electric motor 18 is the reverse (CCW) direction is created in advance. Accordingly, the map shown in FIG. 9 is obtained.

The fourth method is described. In the fourth method, a map showing the "possible region," "indeterminate region," and "impossible region" corresponding to the case where any one of FETs 31 has short-circuit faulted when the electric motor 18 is rotated in either one direction of rotation of the forward (CW) direction and the reverse (CCW) direction is created in advance and stored in a nonvolatile memory. Then, the controllable region identification unit 41 identifies the "possible region," "indeterminate region," and "impossible region" corresponding to the FET 31 that has short-circuit faulted and the direction in which the electric motor 18 rotates based on this map, positional information of the FET 31 identified as the short-circuit faulted FET, and the direction of rotation in which the electric motor 18 should be rotated. The direction in which the electric motor 18 should be rotated is determined based on, for example, an output signal of the torque sensor 11. The positional information of the FET 31 identified as the short-circuit faulted FET is composed of information showing which of U, V, and W phases the FET 31 belongs to (short-circuit faulted phase), and information showing whether the FET 31 is an upper or lower FET.

FIG. 12 shows procedures of a controllable region identification process according to the fourth method.

In the present preferred embodiment, in the map data shown in FIG. 9, only data showing the "possible region," "indeterminate region," and "impossible region" corresponding to the case where the short-circuit faulted FET 31 is the low-side FET $31_{VL}$ of the V phase and the direction of rotation of the electric motor is the forward (CW) direction (hereinafter, referred to as "reference data") is stored as a map in a nonvolatile memory.

The controllable region identification unit 41 determines whether the direction of rotation in which the electric motor 18 should be rotated is the forward (CW) direction (Step S21). When the direction of rotation in which the electric motor 18 should be rotated is the forward (CW) direction (Step S21: YES), the controllable region identification unit 41 shifts to Step S23.

On the other hand, when the direction of rotation in which the electric motor 18 should be rotated is the reverse (CCW) direction (Step S21: NO), the controllable region identification unit 41 converts electric angles (region regulating electric angles α) that regulate the regions ("possible region," "indeterminate region," and "impossible region") in the reference data based on the following equation (5) (Step S22).

In the case of 180°≤α<360°, α=α−180°

In the case of 0≤α<180°, α=α−180°+360°       (5)

Accordingly, the regions ("possible region," "indeterminate region," and "impossible region") are converted. Electric angles that regulate the converted regions are regarded as the region regulating electric angles α. Thereafter, the process shifts to Step S23.

As is understood from FIG. 9, between the forward (CW) direction and the reverse (CCW) direction, the regions corresponding to the FETs 31 that are the same in position (upper or lower position of the same phase) differ by 180 degrees in terms of electric angle from each other. In the present preferred embodiment, reference data is data corresponding to the forward (CW) direction, so that when the direction of rotation in which the electric motor 18 should be rotated is the reverse (CCW) direction, the region regulating electric angles cc are converted into α−180°. However, when the converted electric angle α becomes a negative value, the region regulating electric angle α is converted into α−180°+360°.

In Step S23, the controllable region identification unit 41 determines whether the short-circuit faulted phase that has already been identified is the V phase. When the short-circuit faulted phase that has already been identified is the V phase (Step S23: YES), the controllable region identification unit 41 shifts to Step S27.

When it is determined that the short-circuit faulted phase that has already been identified is not the V phase (Step S23: NO), the controllable region identification unit 41 determines whether the short-circuit faulted phase that has already been identified is the U phase (Step S24). When the short-circuit faulted phase that has already been identified is the U phase (Step S24: YES), the controllable region identification unit 41 converts the region regulating electric angles α based on the following equation (6) (Step S25).

In the case of 120°≤α<360°, α=α−120°

In the case of 0≤α<120°, α=α−120°+360° (6)

Accordingly, the regions ("possible region," "indeterminate region," and "impossible region") are converted. Electric angles that regulate the converted regions are regarded as the region regulating electric angles α. Thereafter, the process shifts to Step S27.

When the short-circuit faulted phase that has already been identified is not U phase, that is, when the short-circuit faulted phase that has already been identified is the W phase (Step S24: NO), the controllable region identification unit 41 converts the region regulating electric angles α based on the following equation (7) (Step S26).

In the case of 0≤α<240°, α=α+120°

In the case of 240°≤α<360°, α=α+120°−360° (7)

Accordingly, the regions ("possible region," "indeterminate region," and "impossible region") are converted. Electric angles that regulate the converted regions are regarded as the region regulating electric angles α. Thereafter, the process shifts to Step S27.

As is understood from FIG. 9, electric angles of the regions ("possible regions," "indeterminate regions," and "impossible regions") corresponding to the FETs 31 that are the same in position upper or lower in the state where the direction of rotation of the electric motor 18 is the same differ from each other according to the short-circuit faulted phase. In the present preferred embodiment, the reference data is data corresponding to the V phase, so that when the short-circuit faulted phase is the U phase, the region regulating electric angles α are converted into α−120°. However, when the converted electric angle α becomes a negative value, the region regulating electric angle α is converted into α−120°+360°.

When the short-circuit faulted phase is the W phase, the region regulating electric angles α are converted into α+120°. However, when the converted electric angle α becomes 360° or more, the region regulating electric angle α is converted into α+120°−360°.

In Step S27, the controllable region identification unit 41 determines whether the short-circuit faulted FET 31 that has already been identified is a lower (low-side) FET. When the short-circuit faulted FET 31 that has already been identified is a lower FET (Step S27: YES), the controllable region identification unit 41 ends the current controllable region identification process.

On the other hand, when the short-circuit faulted FET 31 that has already been identified is the upper (high-side) FET (Step S27: NO), the region regulating electric angles α are converted based on the following equation (8) (Step S25).

In the case of 180°≤α<360°, α=α−180°

In the case of 0≤α<180°, α=α−180°+360° (8)

Accordingly, the regions ("possible region," "indeterminate region," and "impossible region") are converted. Thereafter, the controllable region identification unit 41 ends the current controllable region identification process.

As is understood from FIG. 9, electric angles of the regions ("possible regions," "indeterminate regions," and "impossible regions") corresponding to the FETs 31 that are the same in the direction of rotation of the electric motor 18 and the short-circuit faulted phase differ by 180 degrees from each other depending on whether the short-circuit faulted FET is at the upper or lower position. In the present preferred embodiment, the reference data is data corresponding to a lower FET, so that when the short-circuit faulted FET is an upper FET, the region regulating electric angles α are converted into α−120°. However, when the converted electric angle α becomes a negative value, the region regulating electric angle α is converted into α−120°+360°.

By thus converting the region regulating electric angles α that regulate the regions ("possible region," "indeterminate region," and "impossible region") in the reference data, the "possible region," "indeterminate region," and "impossible region" corresponding to the short-circuit faulted FET 31 and the direction of rotation in which the electric motor 18 should be rotated are obtained.

For example, a case where the short-circuit faulted FET 31 is the upper FET of the U phase and the direction of rotation in which the electric motor 18 should be rotated is the reverse (CCW) direction is described by way of example.

In the reference data, the "possible region" is the range from 150° to 270°. In this example, the direction of rotation in which the electric motor 18 should be rotated is the reverse (CCW) direction, so that by the Step S22, the "possible region" is converted into the range from 330° to 90°. In this example, the short-circuit faulted phase is the U phase, so that by the Step S25, the "possible region" is converted into the range from 210° to 330°. Further, in this example, the short-circuit faulted FET 31 is the upper FET, so that by the Step S28, the "possible region" is converted into the range from 30° to 150°. In FIG. 9, the "possible region" in the case where the short-circuit faulted FET 31 is the upper FET of the U phase and the direction of rotation of the electric motor 18 is the reverse (CCW) direction is the range from 30° to 150°, and this matches the computation results.

In the reference data, the "indeterminate region" is the region from 90° to 150° (one indeterminate region) and the region from 270° to 330° (the other indeterminate region). In this example, the direction of rotation in which the electric motor 18 should be rotated is the reverse (CCW) direction, so that by the step S22, the one indeterminate region is converted into the range from 270° to 330°, and the other indeterminate region is converted into the range from 90° to 150°. In this example, the short-circuit faulted phase is the U phase, so that by the step S25, the one indeterminate region is converted into the range from 150° to 210°, and the other indeterminate region is converted into the range from 330° to 30°. Further, in this example, the short-circuit faulted FET 31 is the upper FET, so that by the Step S28, the one indeterminate region is converted into the range from 330° to 30, and the other indeterminate region is converted into the range from 150° to 210°. In FIG. 9, the "indeterminate region" in the case where the short-circuit faulted FET 31 is the upper FET of the U phase and the direction of rotation of the electric motor 18 is the reverse (CCW) direction is the range from 150° to 210° and the range from 330° to 30°, and this matches the computation results.

Next, the motor control process of Step S15 in FIG. 6 is described. In this motor control process, first, the controllable region identification unit 4 determines a region to which the current electric angle belongs ("possible region," "indeterminate region," or "impossible region"). Then, according to the region to which the current electric angle belongs, the driving unit 43 for time of short-circuit fault is controlled.

When the current electric angle belongs to the "impossible region," the driving unit 43 for time of short-circuit fault does not drive the electric motor 18. When the current electric angle belongs to the "possible region" or "indeterminate region," the driving unit 43 for time of short-circuit fault drives the electric motor 18. For example, when the current electric angle belongs to the "possible region," the driving unit 43 for time of short-circuit fault drives the electric motor 18 by a 120-degree rectangular wave drive method, a 120-degree one-sided PWM drive method, etc. When the current electric angle belongs to the "indeterminate region," the driving unit 43 for time of short-circuit fault drives the electric motor 18 by a rectangular wave drive method, 120-degree rectangular wave drive method, etc.

Hereinafter, a case where the electric motor 18 is driven by a 120-degree rectangular wave drive method when the current electric angle belongs to the "possible region" or "indeterminate region" is described.

Figure 13:
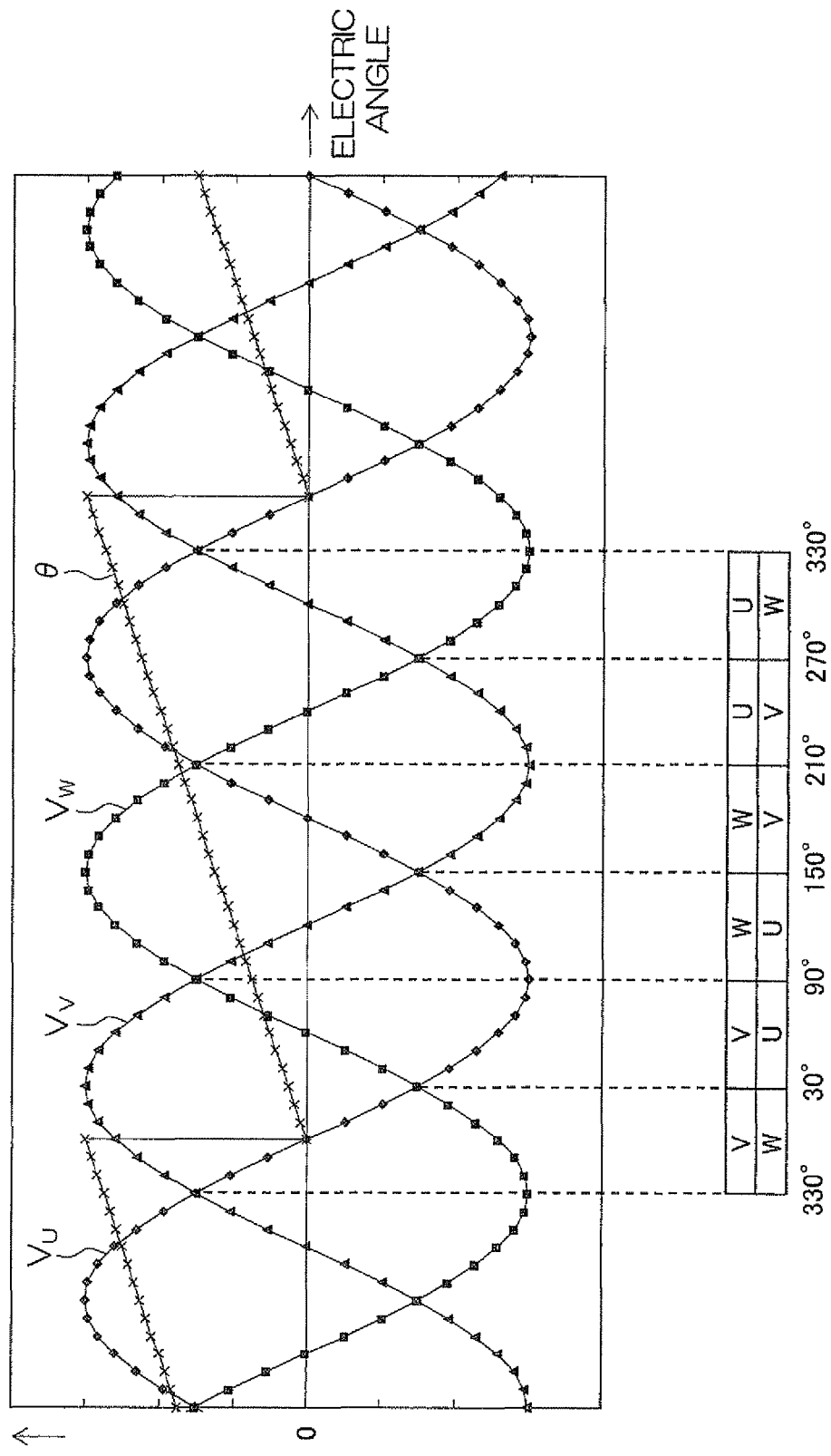
FIG. 13 is an explanatory view for describing timings of turning on/off of FETs when driving the electric motor by a 120-degree rectangular wave drive method in a controllable region.

FIG. 13 is an explanatory view for describing timings of turning-on of the FETs 31 in the case where the electric motor 18 is driven to rotate in the forward direction by a 120-degree rectangular wave drive method. FIG. 13 shows induced voltage waveforms $V_U$, $V_V$, and $V_W$ of the phases with respect to the electric angle θ when the electric motor 18 is driven in a normal state, and timings of turning-on/off of the FETs 31 with respect to the electric angle θ when the electric motor 18 is driven by a 120-degree rectangular wave drive method in a normal state.

In the belt-like timing chart showing timings of turning-on/off of the FETs 31, the upper shows timings of turning-on/off of the high-side FETs, and the lower shows timings of turning-on/off of the low-side FETs. The electric angle range of 360 degrees is divided into six small regions by 60 degrees. In each small region, a character (U, V, or W) to represent a phase corresponding to the FET to be turned on is entered.

According to this timing chart, when the electric motor 18 is driven by a 120-degree rectangular wave drive method in a normal state, the relationships between the small regions and the FETs 31 to be turned on in the small regions are as follows.

330° to 30°: high-side FET 31$_{VH}$ of V phase and low-side FET 31$_{WL}$ of W phase 30° to 90°: high-side FET 31$_{VH}$ of V phase and low-side FET 31$_{UL}$ of U phase 90° to 150°: high-side FET 31$_{WH}$ of W phase and low-side FET 31$_{UL}$ of U phase 150° to 210°: high-side FET 31$_{WH}$ of W phase and low-side FET 31$_{VL}$ of V phase 210° to 270°: high-side FET 31$_{UH}$ of U phase and low-side FET 31$_{VL}$ of V phase 270° to 330°: high-side FET 31$_{UH}$ of U phase and low-side FET 31$_{WL}$ of W phase When one of the six FETs 31 has short-circuit faulted, the driving unit 43 for time of short-circuit fault turns-on two FETs that should be turned on with respect to a current electric angle in the timing chart when the current electric angle is in the "possible region" or "indeterminate region." For example, when the low-side FET 31$_{VL}$ of the V phase has short-circuit faulted, if it is assumed that the direction of rotation of the electric motor 18 is the forward direction, the "possible region," "indeterminate region," and "impossible region" are as follows.

"possible region (U)": 210° to 270°
"possible region (W)": 150° to 210°
"indeterminate region (U)": 270° to 330°
"indeterminate region (W)": 90° to 150°
"impossible region": 330° to 90°

Therefore, when the current electric angle belongs to the electric angle region from 330° to 90° that is the "impossible region," the driving unit 43 for time of short-circuit fault turns-off all FETs other than the FET that has short-circuit faulted. In this case, the electric motor 18 is not driven.

When the current electric angle belongs to the electric angle region from 90° to 150° that is the "indeterminate region (W)," the driving unit 43 for time of short-circuit fault turns-on the high-side FET 31$_{WH}$ of the W phase and the low-side FET 31$_{UL}$ of the U phase according to the timing chart of FIG. 13. In this case, referring to FIG. 2 or FIG. 3, an electric current that has passed through the high-side FET 31$_{WH}$ of the W phase from the power supply 33 passes through the electric motor 18 (field coils 18W, 18U, and 18V) and then flows to the ground 34 via the low-side FET 31$_{UL}$ of the U phase and the low-side FET (faulted FET) 31$_{VL}$ of the V phase. Accordingly, the electric motor 18 is driven and an assist force is generated.

When the current electric angle belongs to the electric angle region from 150° to 210° that is the "possible region (W)," the driving unit 43 for time of short-circuit fault turns-on the high-side FET 31$_{WH}$ of the W phase and the low-side FET (faulted FET) 31$_{VL}$ of the V phase according to the timing chart of FIG. 13. In this case, an electric current that passed through the high-side FET 31$_{WH}$ of the W phase from the power supply 33 passes through the electric motor 18 (field coils 18W and 18V) and then flows to the ground 34 via the low-side FET (faulted FET) 31$_{VL}$ of the V phase. Accordingly, the electric motor 18 is driven and an assist force is generated.

When the current electric angle belongs to the electric angle region from 210° to 270° that is the "possible region (U)," the driving unit 43 for time of short-circuit fault turns-on the high-side FET 31$_{UH}$ of the U phase and the low-side FET (faulted FET) 31$_{VL}$ of the V phase according to the timing chart of FIG. 13. In this case, an electric current that passed through the high-side FET 31$_{UH}$ of the U phase from the power supply 33 passes through the electric motor 18 (field coils 18U and 18V) and then flows to the ground 34 via the low-side FET (faulted FET) 31$_{VL}$ of the V phase. Accordingly, the electric motor 18 is driven and an assist force is generated.

When the current electric angle belongs to the electric angle region from 270° to 330° that is the "indeterminate region (U)" the driving unit 43 for time of short-circuit fault turns-on the high-side FET 31$_{UH}$ of the U phase and the low-side FET 31$_{WL}$ of the W phase according to the timing chart of FIG. 13. In this case, an electric current that passed through the high-side FET 31$_{UH}$ of the U phase from the power supply 33 passes through the electric motor 18 (field coils 18U, 18W, and 18V) and then flows to the ground 34 via the low-side FET 31$_{WL}$ of the W phase and the low-side FET (faulted FET) 31$_{VL}$ of the V phase.

On the other hand, in the case where the high-side FET 31$_{VH}$ of the V phase has short-circuit faulted, when the direction of rotation of the electric motor 18 is the forward direction, the "possible region," "indeterminate region," and "impossible region" are as follows.

"possible region (W)": 330° to 30°
"possible region (U)": 30° to 90°
"indeterminate region (U)": 90° to 150°
"indeterminate region (W)": 270° to 330°
"impossible region": 150° to 270°

Therefore, when the current electric angle belongs to the electric angle region from 330° to 30° that is the "possible region (W)" the driving unit 43 for time of short-circuit fault turns-on the high-side FET (faulted FET) $31_{VH}$ of the V phase and the low-side FET $31_{WL}$ of the W phase according to the timing chart of FIG. 13. In this case, referring to FIG. 2 or FIG. 4, an electric current that passed through the high-side FET (faulted FET) $31_{VH}$ of the V phase from the power supply 33 passes through the electric motor 18 (field coils 18V and 18W) and then flows to the ground 34 via the low-side FET $31_{WL}$ of the W phase.

When the current electric angle belongs to the electric angle region from 30° to 90° that is the "possible region (U)," the driving unit 43 for time of short-circuit fault turns-on the high-side FET (faulted FET) $31_{VH}$ of the V phase and the low-side FET $31_{UL}$ of the U phase according to the timing chart of FIG. 13. In this case, an electric current that passed through the high-side FET (faulted FET) $31_{VH}$ of the V phase from the power supply 33 passes through the electric motor 18 (field coils 18V and 18U) and then flows to the ground 34 via the low-side FET $31_{UL}$ of the U phase.

When the current electric angle belongs to the electric angle region from 90° to 150° that is the "indeterminate region (U)," the driving unit 43 for time of short-circuit fault turns-on the high-side FET $31_{WH}$ of the W phase and the low-side FET $31_{UL}$ of the U phase according to the timing chart of FIG. 13. In this case, an electric current that passed through the high-side FET $31_{WH}$ of the W phase from the power supply 33 passes through the electric motor 18 (field coils 18W and 18U) and then flows to the ground 34 via the low-side FET $31_{UL}$ of the U phase, and an electric current that passed through the high-side FET (faulted FET) $31_{VH}$ of the V phase from the power supply 33 passes through the electric motor 18 (field coils 18V and 18U), and then flows to the ground 34 via the low-side FET $31_{UL}$ of the U phase.

When the current electric angle belongs to the electric angle region from 150° to 270° that is the "impossible region," the driving unit 43 for time of short-circuit fault turns-off all FETs other than the short-circuit faulted FET.

When the current electric angle belongs to the electric angle region from 270° to 330° that is the "indeterminate region (W)," the driving unit 43 for time of short-circuit fault turns-on the high-side FET $31_{UH}$ of the U phase and the low-side FET $31_{WL}$ of the W phase according to the timing chart of FIG. 13. In this case, an electric current that passed through the high-side FET $31_{UH}$ of the U phase from the power supply 33 passes through the electric motor 18 (field coils 18U and 18W) and then flows to the ground 34 via the low-side FET $31_{WL}$ of the W phase, and an electric current that passed through the high-side FET (faulted FET) $31_{VH}$ of the V phase from the power supply 33 passes through the electric motor 18 (field coils 18V and 18W), and then flows to the ground 34 via the low-side FET $31_{WL}$ of the W phase.

To drive the electric motor 18 to rotate in the reverse direction, two FETs that should be turned on with respect to the current electric angle are turned on in the case where the electric motor 18 is driven in the reverse direction by a 120-degree rectangular wave drive method in a normal state when the current electric angle is in the "possible region" or "indeterminate region."

According to the above-described preferred embodiment, when one of six FETs 31 in the driving circuit 30 has short-circuit faulted, an electric angle region (rotor rotation angle region) in which the electric motor 18 can be driven can be identified as a controllable region. Accordingly, it can be determined whether the current electric angle belongs to the controllable region, and when the current electric angle belongs to the controllable region, the electric motor 18 can be driven. As a result, even when one FET has short-circuit faulted, steering can be assisted by the electric motor 18.

A preferred embodiment of the present invention is described above, and the present invention can also be carried out in still other preferred embodiments. For example, in the above-described preferred embodiment, in Step S12 in FIG. 6, first, the controllable region identification unit 41 identifies whether the FET that has short-circuit faulted is a high-side FET or a low-side FET by performing the primary determination process, and then, identifies the phase (short-circuit faulted phase) of the FET 31 that has short-circuit faulted by performing the secondary determination process. In the secondary determination process, the controllable region identification unit 41 applies an electric current to the electric motor 18 by controlling the FETs 31 according to the electric angle, and identifies the short-circuit faulted phase based on voltage waveforms of the phase voltages $V_U$, $V_V$, and $V_W$ of the phases.

However, an FET that has short-circuit faulted may be identified based on the following modification of a process for identifying a short-circuit faulted FET. A concept of the modification of the process for identifying a short-circuit faulted FET is described. In the case where one FET 31 has short-circuit faulted, in a state where all other FETs are off, when the rotor is rotated by a driver's steering operation, as described above, an induced voltage is generated in the electric motor 18, and due to this induced voltage, a load current flows in the impossible region or indeterminate region (for example, refer to FIG. 3, FIG. 4). When the load current flows, it becomes a motor load. As described above, in the impossible region, a load current flows in two closed circuits, and in the indeterminate region, a load current flows in one closed circuit, so that the motor load in the impossible region becomes larger than the motor load in the indeterminate region. Therefore, a steering torque in the impossible region becomes high.

The impossible region differs depending on the direction of rotation of the electric motor 18 and the FET 31 that has short-circuit faulted. Therefore, the rotation angle (motor electric angle) of the rotor at which the absolute value of the steering torque becomes maximum becomes a rotation angle in an impossible region corresponding to the direction of rotation of the electric motor 18 and the FET 31 that has short-circuit faulted. Therefore, by identifying the direction of rotation of the electric motor 18 and the motor electric angle at which the absolute value of the steering torque becomes maximum, the FET 31 that has short-circuit faulted can be identified. The direction of rotation of the electric motor 18 can be identified based on a change in electric angle detected by the rotation angle sensor 52. For example, when the electric angle changes to increase, the direction of rotation of the electric motor 18 is identified as the forward direction, and when the electric angle changes to decrease, the direction of rotation of the electric motor 18 is identified as the reverse direction.

Figure 14A:
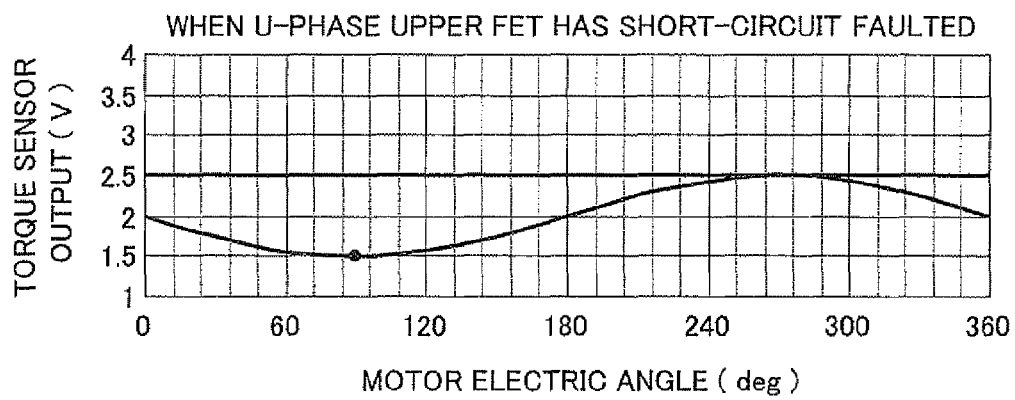
FIG. 14A is a graph showing a theoretical value of an output signal of a torque sensor with respect to a motor electric angle when the electric motor is rotated in the forward (CW) direction in a state where the high-side FET of the U phase has short-circuit faulted and all other FETs are off.
Figure 14B:
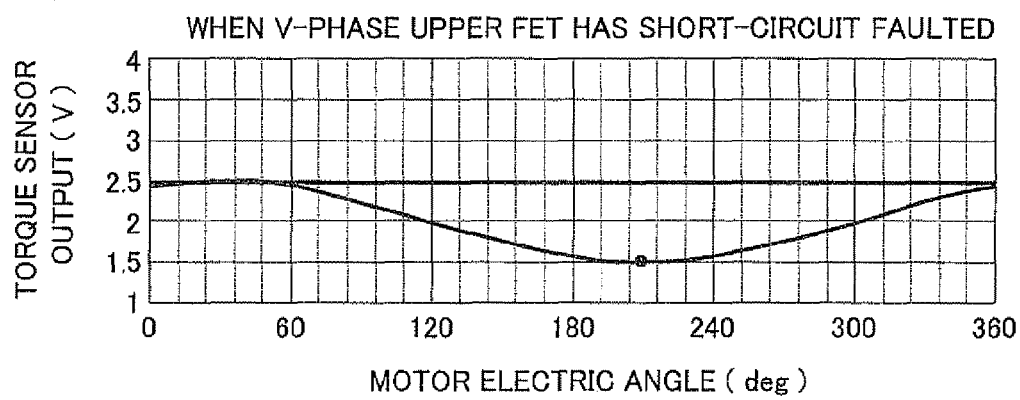
FIG. 14B is a graph showing a theoretical value of an output signal of the torque sensor with respect to a motor electric angle when the electric motor is rotated in the forward (CW) direction in a state where the high-side FET of the V phase has short-circuit faulted and all other FETs are off.
Figure 14C:
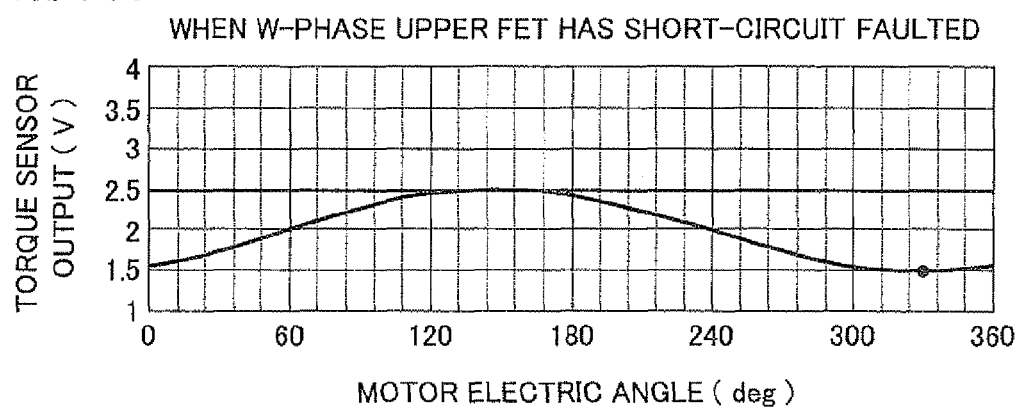
FIG. 14C is a graph showing a theoretical value of an output signal of the torque sensor with respect to a motor electric angle when the electric motor is rotated in the forward (CW) direction in a state where the high-side FET of the W phase has short-circuit faulted and all other FETs are off.

FIG. 14A to FIG. 14C are graphs showing theoretical values (simulation values) of the output signal of the torque sensor 11 with respect to the motor electric angle in the case where the electric motor 18 is rotated in the forward (CW)

direction by a driver's steering operation in a state where one high-side FET 31 has short-circuit faulted and all other FETs are off. The motor electric angles shown in FIG. 14A to FIG. 17C are electric angles when a point at which the induced voltage waveform of the U phase changes from positive to negative in normal driving as shown in FIG. 10 is set as 0°.

In this example, the output signal of the torque sensor 11 is in the range of +2.5±2.5 (V). When the electric motor 18 is rotated in the forward (CW) direction by a driver's steering operation, the output signal of the torque sensor 11 is in the range of +2.5 (V) to 0.5 (V), and the smaller the output signal of the torque sensor 11, the larger the absolute value of the steering torque. When the electric motor 18 is rotated in the reverse (CCW) direction by a driver's steering operation, the output signal of the torque sensor 11 is in the range of +5.0 (V) to 2.5(V), and the larger the output signal of the torque sensor 11, the larger the absolute value of the steering torque.

FIG. 14A shows theoretical values of the output signal of the torque sensor 11 with respect to the motor electric angle when it is assumed that the high-side FET $31_{UH}$ of the U phase has short-circuit faulted. When the motor electric angle is 90 degrees, the absolute value of the steering torque detected by the torque sensor 11 becomes maximum.

FIG. 14B shows theoretical values of the output signal of the torque sensor 11 with respect to the motor electric angle when it is assumed that the high-side FET $31_{VH}$ of the V phase has short-circuit faulted. When the motor electric angle is 210 degrees, the absolute value of the steering torque detected by the torque sensor 11 becomes maximum.

FIG. 14C shows theoretical values of the output signal of the torque sensor 11 with respect to the motor electric angle when it is assumed that the high-side FET $31_{WH}$ of the W phase has short-circuit faulted. When the motor electric angle is 330 degrees, the absolute value of the steering torque detected by the torque sensor 11 becomes maximum.

Figure 15A:
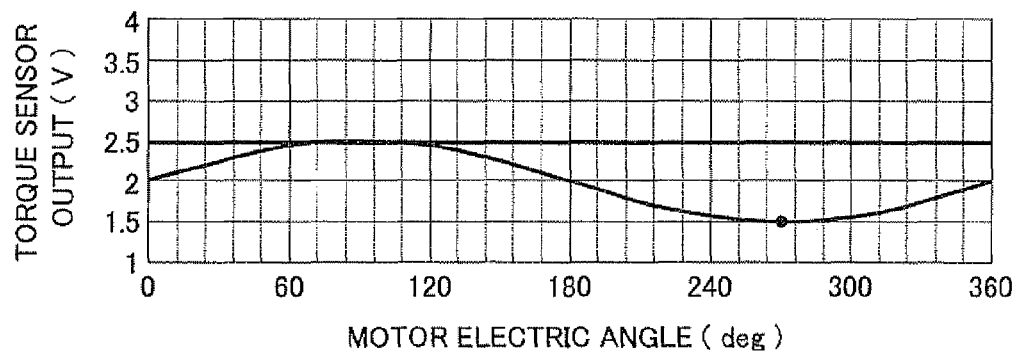
FIG. 15A is a graph showing a theoretical value of an output signal of the torque sensor with respect to a motor electric angle when the electric motor is rotated in the forward (CW) direction in a state where the low-side FET of the U phase has short-circuit faulted and all other FETs are off.
Figure 15B:
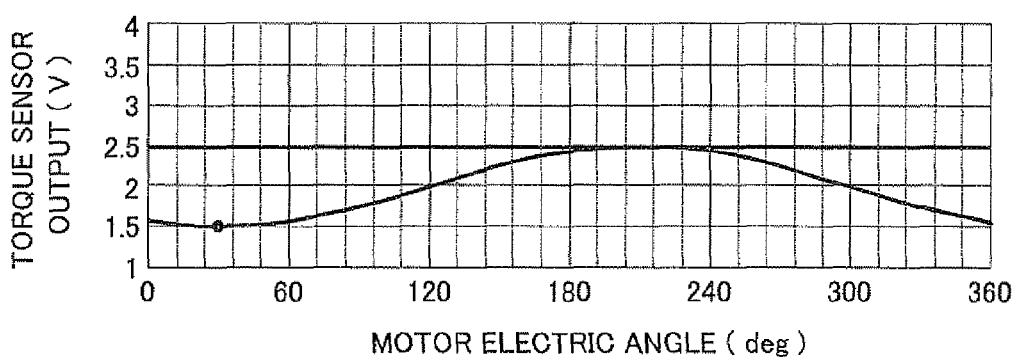
FIG. 15B is a graph showing a theoretical value of an output signal of the torque sensor with respect to a motor electric angle when the electric motor is rotated in the forward (CW) direction in a state where the low-side FET of the V phase has short-circuit faulted and all other FETs are off.
Figure 15C:
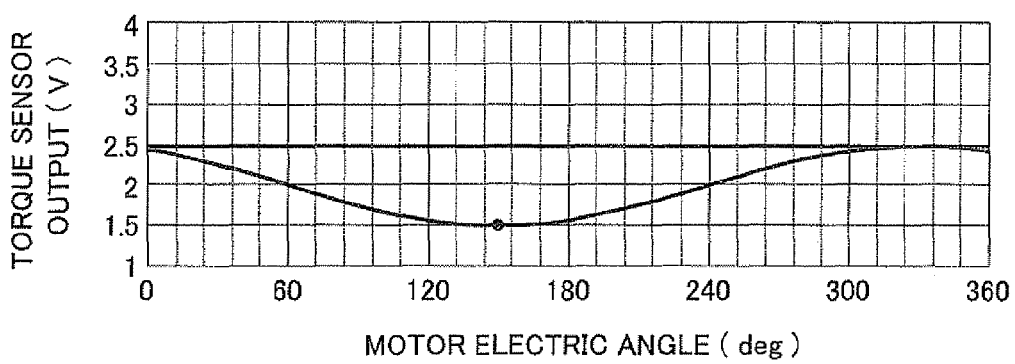
FIG. 15C is a graph showing a theoretical value of an output signal of the torque sensor with respect to a motor electric angle when the electric motor is rotated in the forward (CW) direction in a state where the low-side FET of the W phase has short-circuit faulted and all other FETs are off.

FIG. 15A to FIG. 15C are graphs showing theoretical values of the output signal of the torque sensor 11 with respect to the motor electric angle when the electric motor 18 is rotated in the forward (CW) direction by a driver's steering operation in a state where one low-side FET 31 has short-circuit faulted and all other FETs are off.

FIG. 15A shows theoretical values of the output signal of the torque sensor 11 with respect to the motor electric angle when it is assumed that the low-side FET $31_{UL}$ of the U phase has short-circuit faulted. When the motor electric angle is 270 degrees, the absolute value of the steering torque detected by the torque sensor 11 becomes maximum.

FIG. 15B shows theoretical values of the output signal of the torque sensor 11 with respect to the motor electric angle when it is assumed that the low-side FET $31_{VL}$ of the V phase has short-circuit faulted. When the motor electric angle is 30 degrees, the absolute value of the steering torque detected by the torque sensor 11 becomes maximum.

FIG. 15C shows theoretical values of the output signal of the torque sensor 11 with respect to the motor electric angle when it is assumed that the low-side FET $31_{WL}$ of the W phase has short-circuit faulted. When the motor electric angle is 150 degrees, the absolute value of the steering torque detected by the torque sensor 11 becomes maximum.

Figure 16A:
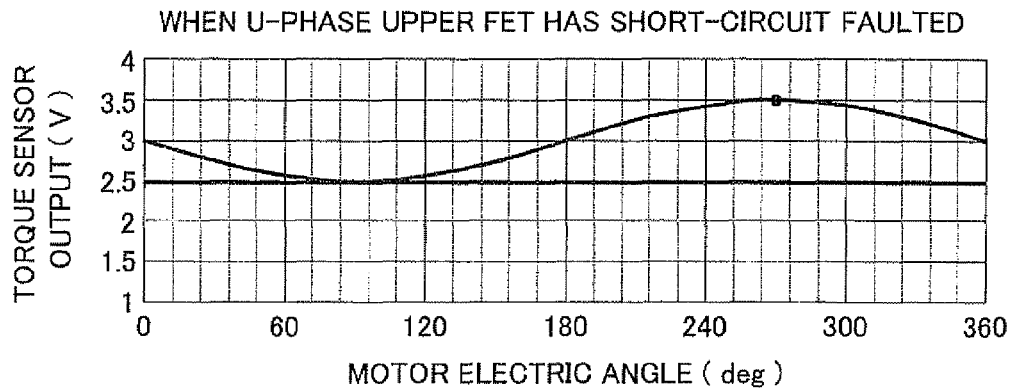
FIG. 16A is a graph showing a theoretical value of an output signal of the torque sensor with respect to a motor electric angle when the electric motor is rotated in the reverse (CCW) direction in a state where the high-side FET of the U phase has short-circuit faulted and all other FETs are off.
Figure 16B:
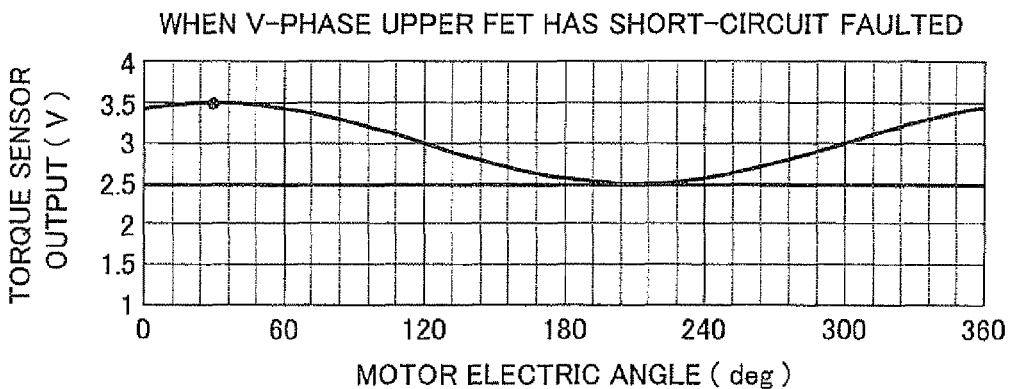
FIG. 16B is a graph showing a theoretical value of an output signal of the torque sensor with respect to a motor electric angle when the electric motor is rotated in the reverse (CCW) direction in a state where the high-side FET of the V phase has short-circuit faulted and all other FETs are off.
Figure 16C:
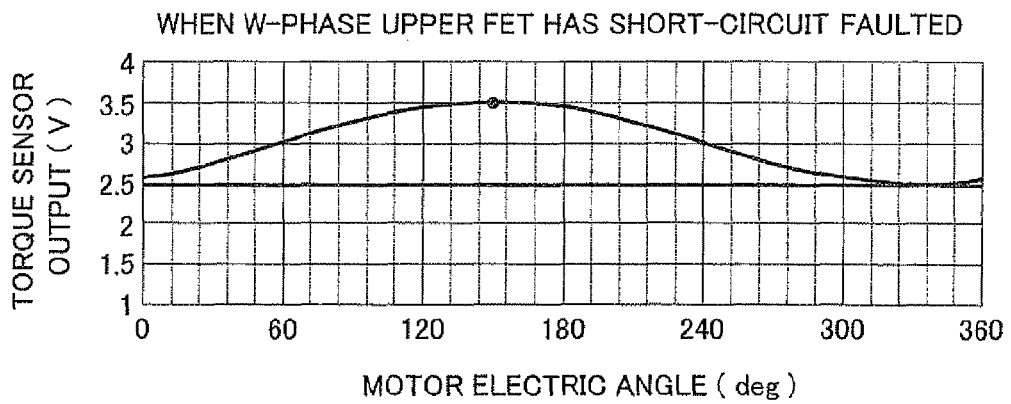
FIG. 16C is a graph showing a theoretical value of an output signal of the torque sensor with respect to a motor electric angle when the electric motor is rotated in the reverse (CCW) direction in a state where the high-side FET of the W phase has short-circuit faulted and all other FETs are off.

FIG. 16A to FIG. 16C are graphs showing theoretical values of the output signal of the torque sensor 11 with respect to the motor electric angle when the electric motor 18 is rotated in the reverse (CCW) direction by a driver's steering operation in a state where one high-side FET 31 has short-circuit faulted and all other FETs are off.

FIG. 16A shows theoretical values of the output signal of the torque sensor 11 with respect to the motor electric angle when it is assumed that the high-side FET $31_{UH}$ of the U phase has short-circuit faulted. When the motor electric angle is 270 degrees, the absolute value of the steering torque detected by the torque sensor 11 becomes maximum.

FIG. 16B shows theoretical values of the output signal of the torque sensor 11 with respect to the motor electric angle when it is assumed that the high-side FET $31_{VH}$ of the V phase has short-circuit faulted. When the motor electric angle is 30 degrees, the absolute value of the steering torque detected by the torque sensor 11 becomes maximum.

FIG. 16C shows theoretical values of the output signal of the torque sensor 11 with respect to the motor electric angle when it is assumed that the high-side FET $31_{WH}$ of the W phase has short-circuit faulted. When the motor electric angle is 150 degrees, the absolute value of the steering torque detected by the torque sensor 11 becomes maximum.

Figure 17A:
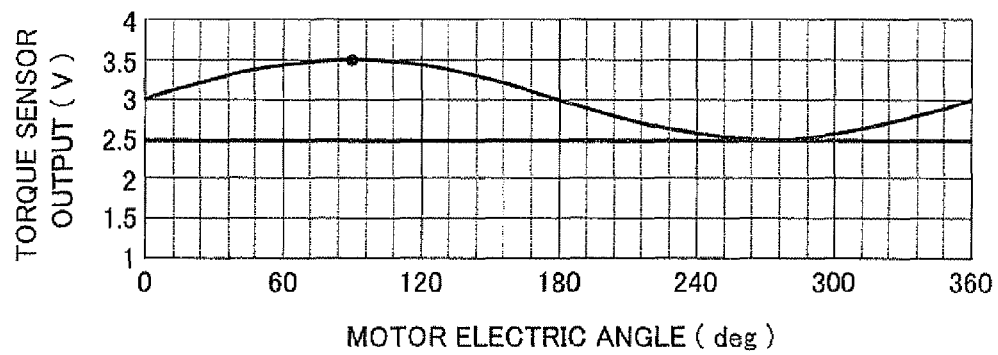
FIG. 17A is a graph showing a theoretical value of an output signal of the torque sensor with respect to a motor electric angle when the electric motor is rotated in the reverse (CCW) direction in a state where the low-side FET of the U phase has short-circuit faulted and all other FETs are off.
Figure 17B:
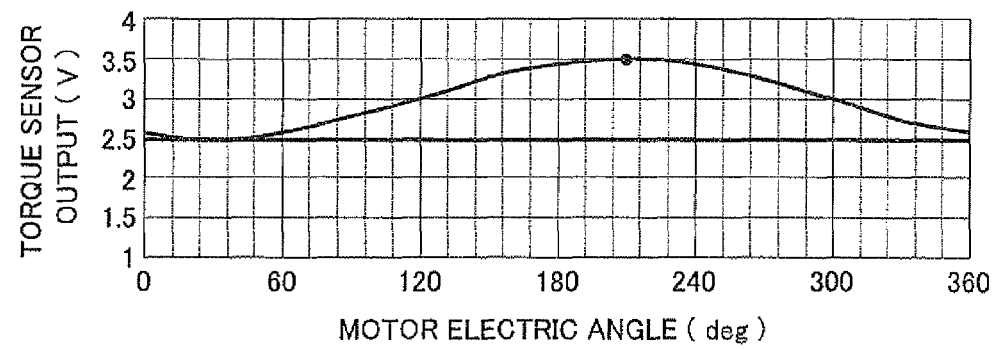
FIG. 17B is a graph showing a theoretical value of an output signal of the torque sensor with respect to a motor electric angle when the electric motor is rotated in the reverse (CCW) direction in a state where the low-side FET of the V phase has short-circuit faulted and all other FETs are off.
Figure 17C:
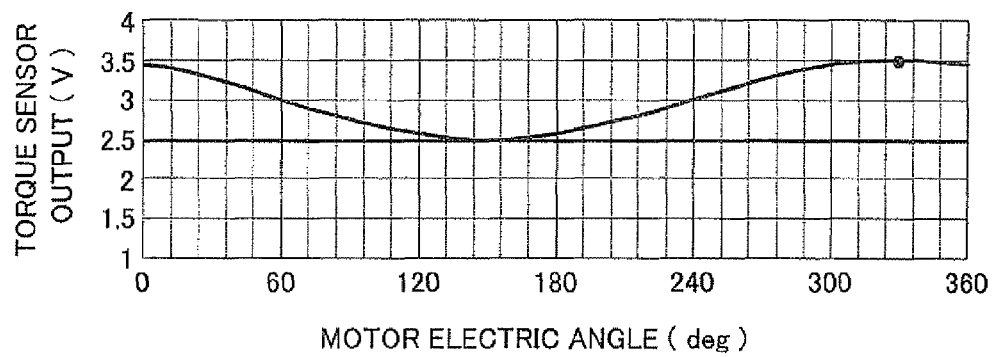
FIG. 17C is a graph showing a theoretical value of an output signal of the torque sensor with respect to a motor electric angle when the electric motor is rotated in the reverse (CCW) direction in a state where the low-side FET of the W phase has short-circuit faulted and all other FETs are off.

FIG. 17A to FIG. 17C are graphs showing theoretical values of the output signal of the torque sensor 11 with respect to the motor electric angle when the electric motor 18 is rotated in the reverse (CCW) direction by a driver's steering operation in a state where one low-side FET 31 has short-circuit faulted and all other FETs are off.

FIG. 17A shows theoretical values of the output signal of the torque sensor 11 with respect to the motor electric angle when it is assumed that the low-side FET $31_{UL}$ of the U phase has short-circuit faulted. When the motor electric angle is 90 degrees, the absolute value of the steering torque detected by the torque sensor 11 becomes maximum.

FIG. 17B shows theoretical values of the output signal of the torque sensor 11 with respect to the motor electric angle when it is assumed that the low-side FET $31_{VL}$ of the V phase has short-circuit faulted. When the motor electric angle is 210 degrees, the absolute value of the steering torque detected by the torque sensor 11 becomes maximum.

FIG. 17C shows theoretical values of the output signal of the torque sensor 11 with respect to the motor electric angle when it is assumed that the low-side FET $31_{WL}$ of the W phase has short-circuit faulted. When the motor electric angle is 330 degrees, the absolute value of the steering torque detected by the torque sensor 11 becomes maximum.

Based on FIG. 14A to FIG. 17C, the relationship between the combination of the direction of rotation of the electric motor and the motor electric angle when the absolute value of the steering torque becomes maximum (hereinafter, referred to as motor electric angle at the maximum torque) and the FET that has short-circuit faulted is as shown in Table 1.

TABLE 1

|  |  |  |  | Motor electric angle at maximum torque |
|---|---|---|---|---|
| Faulted FET | CW | U | Upper | 90° |
|  |  |  | Lower | 270° |
|  |  | V | Upper | 210° |
|  |  |  | Lower | 30° |
|  |  | W | Upper | 330° |
|  |  |  | Lower | 150° |
|  | CCW | U | Upper | 270° |
|  |  |  | Lower | 90° |
|  |  | V | Upper | 30° |
|  |  |  | Lower | 210° |
|  |  | W | Upper | 150° |
|  |  |  | Lower | 330° |

FIG. 18 is a flowchart showing procedures of a modification of a process for identifying the short-circuit faulted FET.

First, the process waits until the steering wheel 2 is steered by a driver (Step S31). When the steering wheel 2 is steered (Step S31: YES), the controllable region identification unit 41 loads a steering torque detected by the torque sensor 11 and a rotation angle (motor electric angle) of the rotor detected by the rotation angle sensor 52, and stores these by associating these with each other (Step S32). Then, the controllable region identification unit 41 determines whether steering torques corresponding to 360-degree or more rotation of the rotor have been loaded (Step S33). When steering torques corresponding to 360-degree or more rotation of the rotor have not been loaded (Step S33: NO), the controllable region identification unit 41 returns to Step S32 and loads and stores a steering torque and a motor electric angle again.

In the Step S33, when it is determined that steering torques corresponding to 360-degree or more rotation of the rotor have been loaded (Step S33: YES), the controllable region identification unit 41 identifies a motor electric angle when the absolute value of the steering torque becomes maximum as a motor electric angle at the maximum torque (Step S34). Then, the controllable region identification unit 41 identifies the FET 31 that has short-circuit faulted based on the identified motor electric angle at the maximum torque, the direction of rotation of the electric motor 18, and the contents of Table 1 (Step S35).

It is considered that the motor electric angle at the maximum torque, identified in Step S34, contains a slight error. Therefore, it is preferably determined which motor electric angle at the maximum torque in Table 1 the identified motor electric angle at the maximum torque corresponds to as follows. That is, for each motor electric angle at the maximum torque shown in Table 1, an electric angle range having a width (for example, ±30°) centered at the motor electric angle is set. Then, by determining which electric angle range the identified motor electric angle at the maximum torque is included in, it is determined which motor electric angle at the maximum torque in Table 1 the identified motor electric angle at the maximum torque corresponds to.

After it is determined by the primary determination process that a short-circuit fault has occurred, the controllable region identification unit 41 may perform the process for identifying a short-circuit faulted FET described with reference to FIG. 18 instead of the secondary determination process.

The present invention can also be applied to a three-phase brushless motor used for purposes other than electric power steering systems.

Preferred embodiments of the present invention are described in detail above, however, these are just detailed examples used for clarifying the technical contents of the present invention, and the present invention should not be interpreted as being limited to these detailed examples, and the scope of the present invention is limited only by the appended claims.

The present application corresponds to Japanese Patent Application No. 2010-75739 filed on Mar. 29, 2010 in Japan Patent Office and Japanese Patent Application No. 2010-215853 filed on Sep. 27, 2010 in Japan Patent Office, the whole disclosures of which are incorporated herein by reference.

DESCRIPTION OF REFERENCE SYMBOLS

18: Electric motor, 30: Driving circuit, 31: FET, 32: Regenerative diode, 33: Power supply, 34: Ground, 40: Control unit

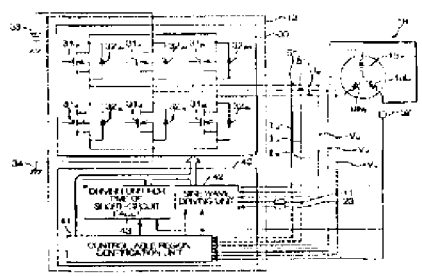

What is claimed is:

1. A motor control device that controls a three-phase brushless motor including a rotor and field coils, comprising:
   a driving circuit that includes three series circuits each formed by connecting two switching elements in series corresponding to three phases, where the series circuits are connected in parallel between a power supply and a ground, and regenerative diodes are connected in parallel to the respective switching elements; and
   a controllable region identifying unit configured to identify a rotor rotation angle region in which driving of the three-phase brushless motor is possible as a controllable region when one of the switching elements has short-circuit faulted;
   wherein when the rotor of the three-phase brushless motor is rotated in a state where all switching elements other than the switching element that has short-circuit faulted are off, in a case where a rotor rotation angle region in which a load current flows in neither of two normal phases is defined as a possible region, a rotor rotation angle region in which a load current flows in either one of the two normal phases is defined as an indeterminate region, and a rotor rotation angle region in which a load current flows in both of the two normal phases is defined as an impossible region, the controllable region identifying unit is arranged to identify a region consisting of the possible region and the indeterminate region or the possible region as the controllable region.

2. The motor control device according to claim 1, wherein the controllable region identifying unit is arranged to identify the controllable region based on phase voltages of the phases in the state where all switching elements other than the switching element that has short-circuit faulted are off.

3. The motor control device according to claim 1, wherein the controllable region identifying unit is arranged to identify the controllable region based on phase voltages of the phases in the state where all switching elements other than the switching element that has short-circuit faulted are off.

4. The motor control device according to claim 1, wherein the controllable region identifying unit is arranged to identify the controllable region based on phase currents of the phases in a state where all switching elements other than the switching element that has short-circuit faulted are off.

5. The motor control device according to claim 1, wherein the controllable region identifying unit is arranged to identify the controllable region based on phase currents of the phases in a state where all switching elements other than the switching element that has short-circuit faulted are off.

6. The motor control device according to claim 1, wherein the controllable region identifying unit is arranged to identify the controllable region based on information showing the position of the switching element that has short-circuit faulted and information that is created in advance for identifying the controllable region from the position of the switching element that has short-circuit faulted.

7. The motor control device according to claim 1, wherein the controllable region identifying unit is arranged to identify the controllable region based on information showing the position of the switching element that has short-circuit faulted and information that is created in advance for identifying the controllable region from the position of the switching element that has short-circuit faulted.

8. The motor control device according to claim 1, wherein the controllable region identifying unit is arranged to identify a controllable region based on information showing the position of the switching element that has short-circuit faulted, a direction of rotation of the three-phase brushless motor, and a map created in advance for identifying the controllable region from the position of the switching element that has short-circuit faulted and the direction of rotation of the three-phase brushless motor.

9. The motor control device according to claim 1, wherein the controllable region identifying unit is arranged to identify a controllable region based on information showing the position of the switching element that has short-circuit faulted, a direction of rotation of the three-phase brushless motor, and a map created in advance for identifying the controllable region from the position of the switching element that has short-circuit faulted and the direction of rotation of the three-phase brushless motor.

10. The motor control device according to claim 8, wherein the map indicates, according to the directions of rotation of the three-phase brushless motor and the switching elements, controllable regions each corresponding to a case where each switching element has short-circuit faulted.

11. The motor control device according to claim 9, wherein the map indicates, according to the directions of rotation of the three-phase brushless motor and the switching elements, controllable regions each corresponding to a case where each switching element has short-circuit faulted.

12. The motor control device according to claim 8, wherein the map indicates a controllable region corresponding to a case where any one of the switching elements has short-circuit faulted when the three-phase brushless motor is rotated in either one direction of rotation of forward and reverse directions.

13. The motor control device according to claim 9, wherein the map indicates a controllable region corresponding to a case where any one of the switching elements has short-circuit faulted when the three-phase brushless motor is rotated in either one direction of rotation of forward and reverse directions.

14. The motor control device according to claim 12, wherein the controllable region identifying unit includes a unit configured to convert a controllable region indicated by the map into a controllable region corresponding to a position of the switching element that has short-circuit faulted and a direction of rotation of the three-phase brushless motor based on information showing the position of the switching element that has short-circuit faulted, the direction of rotation of the three-phase brushless motor, and the map.

15. The motor control device according to claim 13, wherein the controllable region identifying unit includes a unit configured to convert a controllable region indicated by the map into a controllable region corresponding to a position of the switching element that has short-circuit faulted and a direction of rotation of the three-phase brushless motor based on information showing the position of the switching element that has short-circuit faulted, the direction of rotation of the three-phase brushless motor, and the map.

16. The motor control device according to claim 1, further comprising:
- a fault position identifying unit configured to identify, when one of the switching elements has short-circuit faulted, the position of the switching element that has short-circuit faulted; and
- a motor control unit configured to drive the three-phase brushless motor by the normal phases when the rotor rotation angle is in the controllable region.

* * * * *

UNITED STATES PATENT AND TRADEMARK OFFICE
CERTIFICATE OF CORRECTION

| | | |
|---|---|---|
| PATENT NO. | : 8,736,208 B2 | Page 1 of 2 |
| APPLICATION NO. | : 13/581951 | |
| DATED | : May 27, 2014 | |
| INVENTOR(S) | : Shigekazu Okumura et al. | |

It is certified that error appears in the above-identified patent and that said Letters Patent is hereby corrected as shown below:

Delete the title page and substitute therefore with the attached title page showing the corrected number of claims in patent.

In the Claims

In column 32, lines 30-34, Claim 3 is canceled.

In column 32, lines 40-44, Claim 5 is canceled.

In column 32, lines 53-58, Claim 7 is canceled.

In column 33, lines 1-9, Claim 9 is canceled.

Signed and Sealed this
Twenty-seventh Day of January, 2015

Michelle K. Lee
*Deputy Director of the United States Patent and Trademark Office*

(12) United States Patent
Okumura et al.

(10) Patent No.: US 8,736,208 B2
(45) Date of Patent: May 27, 2014

(54) MOTOR CONTROL DEVICE

(75) Inventors: Shigekazu Okumura, Sakurai (JP);
Fumihiko Satou, Kashiwara (JP);
Hiroshi Sumasu, Kashihara (JP)

(73) Assignee: Jtekt Corporation, Osaka-Shi (JP)

(*) Notice: Subject to any disclaimer, the term of this patent is extended or adjusted under 35 U.S.C. 154(b) by 113 days.

(21) Appl. No.: 13/581,951

(22) PCT Filed: Mar. 25, 2011

(86) PCT No.: PCT/JP2011/057396
§ 371 (c)(1),
(2), (4) Date: Aug. 30, 2012

(87) PCT Pub. No.: WO2011/122482
PCT Pub. Date: Oct. 6, 2011

(65) Prior Publication Data
US 2012/0326644 A1    Dec. 27, 2012

(30) Foreign Application Priority Data

Mar. 29, 2010 (JP) ................ 2010-075739
Sep. 27, 2010 (JP) ................ 2010-215853

(51) Int. Cl.
*H02H 7/08*    (2006.01)

(52) U.S. Cl.
USPC .......... 318/400.21; 318/362; 318/400.07; 318/400.09; 318/490; 340/657; 340/664; 340/426.31; 340/465; 340/517

(58) Field of Classification Search
CPC .... B62D 5/0487; B62D 5/046; B62D 5/0484; B62D 5/049; H02M 1/32; H02M 7/53873; H02P 29/022; H02P 2209/01; H02P 27/06; H02P 27/08; H02P 6/16; H02P 29/021; H02P 2207/01; H02P 27/042; H02P 21/10; H02P 23/0077; H02P 6/14; H02P 29/02; H02P 2209/07; H02P 6/10; H02P 6/06; H02P 6/08; H02P 6/001; H02P 6/12; H02P 6/22; H02P 6/085; H02P 6/003; H02P 6/002; H02P 6/182; H02P 23/08; Y02T 10/70; Y02T 10/7005; G05B 9/02; G05B 19/4062; G05B 23/0235; B25J 9/1674; B25J 19/06; G05D 1/0077; H02H 7/093; H02H 7/0833; B60K 35/00; B62B 3/0612; B62B 5/063; B01R 31/025; B01R 31/34; H02K 29/00; E21B 47/12; E21B 47/00; E21B 47/06; E21B 47/065; E21B 44/00; E21B 47/022; E21B 44/005; E21B 7/062; G01V 11/002; G01R 31/025; G01R 31/34; A61H 33/005; G08B 21/185; H01H 71/04

USPC ............ 318/515, 299, 400.21, 528, 400.22, 318/782, 563, 565, 648, 650, 652, 799, 809, 318/400.17, 400.26, 801, 715, 265, 369, 318/366; 340/426.31, 465, 648, 517, 664, 340/657; 180/400, 402

See application file for complete search history.

(56) References Cited

U.S. PATENT DOCUMENTS

| | | | |
|---|---|---|---|
| 5,914,582 A * | 6/1999 | Takamoto et al. | 318/801 |
| 2005/0174083 A1* | 8/2005 | Sato | 318/565 |

(Continued)

FOREIGN PATENT DOCUMENTS

| | | |
|---|---|---|
| DE | 10 2008 034 326 A1 | 2/2009 |
| JP | A-2007-099066 | 4/2007 |

(Continued)

OTHER PUBLICATIONS

International Search Report issued in Application No. PCT/JP2011/057396; Dated Jun. 28, 2011 (With Translation)

(Continued)

*Primary Examiner* — Shawki S Ismail
*Assistant Examiner* — Jorge L Carrasquillo
(74) *Attorney, Agent, or Firm* — Oliff PLC

(57) ABSTRACT

When one of six FETs has short-circuit faulted, a controllable region identification unit stops driving of an electric motor, and then performs processes for determining whether a short-circuit fault has occurred, and when a short-circuit fault has occurred, for identifying the position of the FET that has short-circuit faulted based on phase voltages (induced voltages) $V'_U$, $V'_V$, and $V'_W$ of phases. When the position of the FET that has short-circuit faulted is identified, the controllable region identification unit performs a controllable region identification process. In detail, the controllable region identification unit identifies a "possible region," an "indeterminate region," and a "impossible region" based on phase voltages $V'_U$, $V'_V$, and $V'_W$ of the phases.

16 Claims, 19 Drawing Sheets

UNITED STATES PATENT AND TRADEMARK OFFICE
CERTIFICATE OF CORRECTION

PATENT NO. : 8,736,208 B2
APPLICATION NO. : 13/581951
DATED : May 27, 2014
INVENTOR(S) : Shigekazu Okumura et al.

It is certified that error appears in the above-identified patent and that said Letters Patent is hereby corrected as shown below:

Delete the title page and substitute therefore with the attached title page showing the corrected number of claims in patent.

In the Claims

In column 32, lines 30-34, Claim 3 is canceled.

In column 32, lines 40-44, Claim 5 is canceled.

In column 32, lines 53-58, Claim 7 is canceled.

In column 33, lines 1-9, Claim 9 is canceled.

This certificate supersedes the Certificate of Correction issued January 27, 2015.

Signed and Sealed this
Twenty-fourth Day of March, 2015

Michelle K. Lee
*Director of the United States Patent and Trademark Office*

(12) United States Patent
Okumura et al.

(10) Patent No.: US 8,736,208 B2
(45) Date of Patent: May 27, 2014

(54) MOTOR CONTROL DEVICE

(75) Inventors: Shigekazu Okumura, Sakurai (JP); Fumihiko Satou, Kashiwara (JP); Hiroshi Sumasu, Kashihara (JP)

(73) Assignee: Jtekt Corporation, Osaka-Shi (JP)

(*) Notice: Subject to any disclaimer, the term of this patent is extended or adjusted under 35 U.S.C. 154(b) by 113 days.

(21) Appl. No.: 13/581,951

(22) PCT Filed: Mar. 25, 2011

(86) PCT No.: PCT/JP2011/057396
§ 371 (c)(1),
(2), (4) Date: Aug. 30, 2012

(87) PCT Pub. No.: WO2011/122482
PCT Pub. Date: Oct. 6, 2011

(65) Prior Publication Data
US 2012/0326644 A1 Dec. 27, 2012

(30) Foreign Application Priority Data

Mar. 29, 2010 (JP) ............... 2010-075739
Sep. 27, 2010 (JP) ............... 2010-215853

(51) Int. Cl.
H02H 7/08 (2006.01)

(52) U.S. Cl.
USPC ............... 318/400.21; 318/362; 318/400.07; 318/400.09; 318/490; 340/657; 340/664; 340/426.31; 340/465; 340/517

(58) Field of Classification Search
CPC .... B62D 5/0487; B62D 5/046; B62D 5/0484; B62D 5/049; H02M 1/32; H02M 7/53873; H02P 29/022; H02P 2209/01; H02P 27/06; H02P 27/08; H02P 6/16; H02P 29/021; H02P 2207/01; H02P 27/042; H02P 21/10; H02P 23/0077; H02P 6/14; H02P 29/02; H02P 2209/07; H02P 6/10; H02P 6/06; H02P 6/08; H02P 6/001; H02P 6/12; H02P 6/22; H02P 6/085; H02P 6/003; H02P 6/002; H02P 6/182; H02P 23/08; Y02T 10/70; Y02T 10/7005; G05B 9/02; G05B 19/4062; G05B 23/0235; B25J 9/1674; B25J 19/06; G05D 1/0077; H02H 7/093; H02H 7/0833; B60K 35/00; B62B 3/0612; B62B 5/063; B01R 31/025; B01R 31/34; H02K 29/00;
E21B 47/12; E21B 47/00; E21B 47/06; E21B 47/065; E21B 44/00; E21B 47/022; E21B 44/005; E21B 7/062; G01V 11/002; G01R 31/025; G01R 31/34; A61H 33/005; G08B 21/185; H01H 71/04
USPC ............... 318/515, 299, 400.21, 528, 400.22, 318/782, 563, 565, 648, 650, 652, 799, 809, 318/400.17, 400.26, 801, 715, 265, 369, 318/366; 340/426.31, 465, 648, 517, 664, 340/657; 180/400, 402
See application file for complete search history.

(56) References Cited

U.S. PATENT DOCUMENTS 5,916,583 A * 6/1999 Takamoto et al. ........... 318/801
2005/0174083 A1* 8/2005 Sato ............................ 318/565

(Continued)

FOREIGN PATENT DOCUMENTS

DE 10 2008 034 326 A1 2/2009
JP A-2007-099066 4/2007

(Continued)

OTHER PUBLICATIONS

International Search Report issued in Application No. PCT/JP2011/057396; Dated Jun. 28, 2011 (With Translation).

(Continued)

Primary Examiner — Shawki S Ismail
Assistant Examiner — Jorge L. Carrasquillo
(74) Attorney, Agent, or Firm — Oliff PLC

(57) ABSTRACT

When one of six FETs has short-circuit faulted, a controllable region identification unit stops driving of an electric motor, and then performs processes for determining whether a short-circuit fault has occurred, and when a short-circuit fault has occurred, for identifying the position of the FET that has short-circuit faulted based on phase voltages (induced voltages) $V_U$, $V_P$, and $V_W$ of phases. When the position of the FET that has short-circuit faulted is identified, the controllable region identification unit performs a controllable region identification process. In detail, the controllable region identification unit identifies a "possible region," an "indeterminate region," and a "impossible region" based on phase voltages $V_U$, $V_P$, and $V_W$ of the phases.

12 Claims, 19 Drawing Sheets